(12) United States Patent
Kozareva et al.

(10) Patent No.: US 11,030,394 B1
(45) Date of Patent: Jun. 8, 2021

(54) NEURAL MODELS FOR KEYPHRASE EXTRACTION

(71) Applicant: Amazon Technologies, Inc., Seattle, WA (US)

(72) Inventors: Zornitsa Petrova Kozareva, Santa Clara, CA (US); Sheng Zha, Menlo Park, CA (US); Hyokun Yun, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/586,778

(22) Filed: May 4, 2017

(51) Int. Cl.
*G06N 3/04* (2006.01)
*G10L 15/08* (2006.01)
*G06F 40/151* (2020.01)
*G06N 3/08* (2006.01)
*G06F 40/30* (2020.01)

(52) U.S. Cl.
CPC ............ *G06F 40/151* (2020.01); *G06F 40/30* (2020.01); *G06N 3/0454* (2013.01); *G06N 3/08* (2013.01); *G10L 2015/088* (2013.01)

(58) Field of Classification Search
CPC .............. G06N 3/0454; G06F 17/2705; G10L 2015/088
See application file for complete search history.

(56) References Cited

U.S. PATENT DOCUMENTS

| | | | | |
|---|---|---|---|---|
| 8,527,276 B1 * | 9/2013 | Senior | .................... | G06N 3/084 704/259 |
| 9,767,557 B1 * | 9/2017 | Gulsun | ................. | G06T 7/0012 |
| 10,007,863 B1 * | 6/2018 | Pereira | ...................... | G06T 7/60 |
| 10,540,378 B1 * | 1/2020 | Hsiao | ....................... | G06K 9/78 |
| 2003/0169925 A1 * | 9/2003 | Polonowski | ......... | G06K 9/6272 382/198 |
| 2007/0112764 A1 * | 5/2007 | Yih | ....................... | G06F 17/241 |
| 2012/0033874 A1 * | 2/2012 | Perronnin | ............ | G06K 9/6828 382/159 |
| 2015/0019204 A1 * | 1/2015 | Simard | ............... | G06F 17/2785 704/9 |
| 2015/0186497 A1 * | 7/2015 | Patton | ..................... | H04W 4/21 707/740 |
| 2015/0254566 A1 * | 9/2015 | Chandramouli | ........ | G06F 40/40 706/11 |
| 2015/0269431 A1 * | 9/2015 | Haji | ................... | G06K 9/00879 382/186 |

(Continued)

OTHER PUBLICATIONS

Barker, K., and N. Cornacchia, "Using Noun Phrase Heads to Extract Document Keyphrases," Proceedings of the 13th Biennial Conference of the Canadian Society on Computational Studies of Intelligence AI 2000: Advances in Artificial Intelligence, vol. 1822, Montreal, QC, Canada, May 14-17, 2000, pp. 40-52.

(Continued)

*Primary Examiner* — Bryan S Blankenagel
(74) *Attorney, Agent, or Firm* — Davis Wright Tremaine LLP

(57) ABSTRACT

A keyphrase extraction service implements techniques for determining a set of keyphrases associated with set of words. A word is selected from the set of words and a neural model is used to determine a label for the word based on features of the word and labels corresponding to other words of the set of words. The set of keyphrases is determined from the labels associated with the set of words.

20 Claims, 16 Drawing Sheets

(56) References Cited

U.S. PATENT DOCUMENTS

| | | | |
|---|---|---|---|
| 2016/0283841 A1* | 9/2016 | Sainath | G06N 3/0454 |
| 2016/0364377 A1* | 12/2016 | Krishnamurthy | G06F 17/271 |
| 2017/0011279 A1* | 1/2017 | Soldevila | G06N 3/04 |
| 2018/0121799 A1* | 5/2018 | Hashimoto | G06F 17/2705 |
| 2018/0157638 A1* | 6/2018 | Li | G06F 17/279 |
| 2018/0275967 A1* | 9/2018 | Mohamed | G06F 8/30 |
| 2019/0034416 A1* | 1/2019 | Al Hasan | G06F 17/2785 |

OTHER PUBLICATIONS

Berend, G., and V. Vincze, "How to Evaluate Opinionated Keyphrase Extraction?," Proceedings of the 3rd Workshop on Computational Approaches to Subjectivity and Sentiment Analysis, Jeju, Republic of Korea, Jul. 12, 2012, pp. 99-103.

Berend, G., and R. Farkas, "SZTERGAK : Feature Engineering for Keyphrase Extraction," Proceedings of the 5th International Workshop on Semantic Evaluation, ACL 2010, Uppsala, Sweden, Jul. 15-16, 2010, pp. 186-189.

Cho, K., et al., "Learning Phrase Representations Using RNN Encoder—Decoder for Statistical Machine Translation," arXiv:1406. 1078v3, Sep. 3, 2014, 15 pages.

Eichler, K., and G. Neumann, "DFKI KeyWE: Ranking Keyphrases Extracted From Scientific Articles," Proceedings of 5th International Workshop on Semanic Evaluation, ALC 2010, Uppsala, Sweden, Jul. 15-16, 2010, pp. 150-153.

Fonseca, E.R., and J.L.G. Rosa, "A Two-Step Convolutional Neural Network Approach for Semantic Role Labeling," The 2013 International Joint Conference on Neural Networks (IJCNN), Dallas, Texas, Aug. 4-9, 2013, 7 pages.

Grineva, M., et al., "Extracting Key Terms From Noisy and Multi-Theme Documents," Proceedings of the 18th International Conference on World Wide Web, Madrid, Spain, Apr. 20-24, 2009, pp. 661-670.

Gutwin, C., et al., "Improving Browsing in Digital Libraries With Keyphrase Indexes," Decision Support Systems 27(1-2):81-104, Nov. 1999.

Hasan, K.S., and NG, V., "Automatic Keyphrase Extraction: A Survey of the State of the Art," Proceedings of the 52nd Annual Meeting of the Association for Computational Linguistics, Baltimore, Maryland, Jun. 23-25, 2014, pp. 1262-1273.

Hochreiter, S., and J. Schmidhuber, "Long Short-Term Memory," Neural Computation 9(8):1735-1780, Nov. 15, 1997.

Hulth, A., and B.B. Megyesi, "A Study on Automatically Extracted Keywords in Text Categorization," Proceedings of the 21st International Conference on Computational Linguistics and 44th Annual Meeting of the Association for Computational Linguistics, Sydney, Australia, Jul. 17-18, 2006, pp. 537-544.

Hulth, A., "Enhancing Linguistically Oriented Automatic Keyword Extraction," Proceeding of the HLT-NAACL-Short 04 Proceedings of HLT-NAACL 2004: Short Papers, Boston, Massachusetts, May 2-7, 2004, pp. 17-20.

Hulth, A., "Improved Automatic Keyword Extraction Given More Linguistic Knowledge," Proceedings of the 2003 Conference on Empirical Methods in Natural Language Processing, Jul. 11, 2003, pp. 216-223.

Jiang, X., et al., "A Ranking Approach to Keyphrase Extraction," Proceedings of the 32nd International ACM SIGIR Conference on Research and Development in Information Retrieval, Boston, Massachusetts, Jul. 19-23, 2009, pp. 756-757.

Kelleher, D., and S. Luz, "Automatic Hypertext Keyphrase Detection," International Joint Conference on Artificial Intelligence 5:1608-1609, Jul. 30, 2005.

Kim, S.N., and M.-Y. Kan, "Re-examining Automatic Keyphrase Extraction Approaches in Scientific Articles," Proceedings of the 2009 Workshop on Multiword Expressions, Suntec, Singapore, Aug. 6, 2009, pp. 9-16.

Kim, S.N., et al., "SemEval-2010 Task 5: Automatic Keyphrase Extraction from Scientific Articles," Proceedings of the 5th International Workshop on Semantic Evaluation, Uppsala, Sweden, Jul. 15-16, 2010, pp. 21-26.

Lample, G., et al., "Neural Architectures for Named Entity Recognition," arXiv:1603.01360v3, Apr. 7, 2016, 11 pages.

Ling, W., et al., "Two/Too Simple Adaptations of Word2Vec for Syntax Problems," Human Language Technologies: The 2015 Annual Conference of the North American Chapter of the ACL, Denver, Colorado, May 31-Jun. 5, 2015, pp. 1299-1304.

Liu, F., et al., "Unsupervised Approaches for Automatic Keyword Extraction Using Meeting Transcripts," Human Language Technologies: The 2009 Annual Conference of the North American Chapter of the ACL, Boulder, Colorado, May 31-Jun. 5, 2009, pp. 620-628.

Liu, R., and E. Nyberg, "A Phased Ranking Model for Question Answering," Proceedings of the 22nd ACM International Conference on Information & Knowledge Management, San Francisco, California, Oct. 27-Nov. 1, 2013, pp. 79-88.

Liu, Z., et al., "Automatic Keyphrase Extraction via Topic Decomposition," Proceedings of the 2010 Conference on Empirical Methods in Natural Language Processing, Cambridge, Massachusetts, Oct. 9-11, 2010, pp. 366-376.

Liu, Z., et al., "Clustering to Find Exemplar Terms for Keyphrase Extraction," Proceedings of the 2009 Conference on Empirical Methods in Natural Language Processing, Singapore, Aug. 6-7, 2009, pp. 257-266.

Lopez, P., and L. Romary, "HUMB: Automatic Key Term Extraction From Scientific Articles in GROBID," Proceedings of the 5th International Workshop on Semantic Evaluation, Uppsala, Sweden, Jul. 15-16, 2010, pp. 248-251.

Marujo, L., et al., "Automatic Keyword Extraction on Twitter," ACL 2:637-643, 2015.

Marujo, L., et al., "Keyphrase Cloud Generation of Broadcast News," Proceedings of Interspeech 2011: 12th Annual Conference of the International Speech Communication Association, Florence, Italy, Aug. 28-31, 2011, 4 pages.

Medelyan, O., et al., "Subject Metadata Support Powered by Maui," Proceedings of the 10th Annual Joint Conference on Digital Libraries, Gold Coast, Queensland, Australia, Jun. 21-25, 2010, 1 page.

Mihalcea, R., and P. Tarau, "TextRank: Bringing Order Into Texts," Association for Computational Linguistics, 2004, 8 pages.

Ouyang, Y., et al., "273. Task 5. Keyphrase Extraction Based on Core Word Identification and Word Expansion," Proceedings of the 5th International Workshop on Semantic Evaluation, Uppsala, Sweden, Jul. 15-16, 2010, pp. 142-145.

Pal, A.R., and S. Diganta, "An Approach to Automatic Text Summarization Using WordNet," 2014 IEEE International Advance Computing Conference, Gurgaon, India, Feb. 21-22, 2014, pp. 1169-1173.

Pasquier, C., "Task 5: Single Document Keyphrase Extraction Using Sentence Clustering and Latent Dirichlet Allocation," Proceedings of the 5th International Workshop on Semantic Evaluation, Uppsala, Sweden, Jul. 15-16, 2010, pp. 154-157.

Pham, V., et al., "Dropout Improves Recurrent Neural Networks for Handwriting Recognition," 14th International Conference on Frontiers in Handwriting Recognition, Heraklion, Greece, Sep. 1-4, 2014, 6 pages.

Robbins, H., and S. Monro, "A Stochastic Approximation Method," The Annals of Mathematical Statistics 22(3):400-407, Sep. 1951.

Sutskever, I., et al., "Sequence to Sequence Learning With Neural Networks," Advances in Neural Information Processing Systems, 2014, pp. 3104-3112.

Turney, P.D., "Coherent Keyphrase Extraction via Web Mining," Proceedings of the Eighteenth International Joint Conference on Artificial Intelligence, Acapulco, Mexico, 2003, pp. 434-439.

Turney, P.D., "Learning Algorithms for Keyphrase Extraction," Information Retrieval 2(4):303-336, Jul. 2000.

Uchimoto, K., et al., "Named Entity Extraction Based on a Maximum Entropy Model and Transformation Rules," Proceedings of the 38th Annual Meeting on Association for Computational Linguistics, Hong Kong, Oct. 3-6, 2000, pp. 326-335.

(56) References Cited

OTHER PUBLICATIONS

Wang, L., and F. Li, "SJTULTLAB: Chunk Based Method for Keyphrase Extraction," Proceedings of the 5th International Workshop on Semantic Evaluation, Uppsala, Sweden, Jul. 15-16, 2010, pp. 158-161.

Witten, I.H., et al., "KEA: Practical Automatic Keyphrase Extraction," Proceedings of the Fourth ACM Conference on Digital Libraries, Berkeley, California, Aug. 11-14, 1999, pp. 254-255.

Wu, Y., et al., "Google's Neural Machine Translation System: Bridging the Gap Between Human and Machine Translation," arXiv:1609.08144v2, Oct. 8, 2016, 23 pages.

Yang, Z., and E. Nyberg, "Leveraging Procedural Knowledge for Task-Oriented Search," Proceedings of the 38th International ACM SIGIR Conference on Research and Development in Information Retrieval, Santiago, Chile, Aug. 9-13, 2015, pp. 513-522.

Zaremba, W., et al., "Recurrent Neural Network Regularization," arXiv:1409.2329v5, Feb. 19, 2015, pp. 1-8.

Zhai, F., et al., "Neural Models for Sequence Chunking," arXiv:1701.04027v1, Jan. 15, 2017, 8 pages.

Zhang, Y., et al., "World Wide Web Site Summarization," Web Intelligence and Agent Systems: An International Journal 2(1):39-53, 2004.

Zhao, W.X., et al., "Topical Keyphrase Extraction From Twitter," Proceedings of the 49th Annual Meeting of the Association for Computational Linguistics, Portland, Oregon, Jun. 19-24, 2011, pp. 379-388.

\* cited by examiner $$w_i^{full} := \left(w_i^{char}, w_i^{word}, w_i^{gaz}\right)$$

Word-Level Input Features

FIG. 12

US 11,030,394 B1

NEURAL MODELS FOR KEYPHRASE EXTRACTION

BACKGROUND

The use of hosted computing services and storage has proliferated in recent years where large-scale networks of computer systems execute a variety of applications and services. This variety of applications and services that are used for various purposes can generate large amounts of data that, in some instances, can be in the form of documents of various lengths and in various languages. In some cases, the volume of data available creates challenges for those who wish to characterize such documents to aid in processing the data contained in the document. Determining the salient features of the documents, for example, can be a challenging problem often addressed through significant compute resource usage and/or human intervention.

BRIEF DESCRIPTION OF THE DRAWINGS

Various techniques will be described with reference to the drawings, in which:

FIG. 12 illustrates an example of an equation for extracting word-level features based in part on a character encoding result usable by a keyphrase extraction service, in accordance with one embodiment;

DETAILED DESCRIPTION

Figure 1:
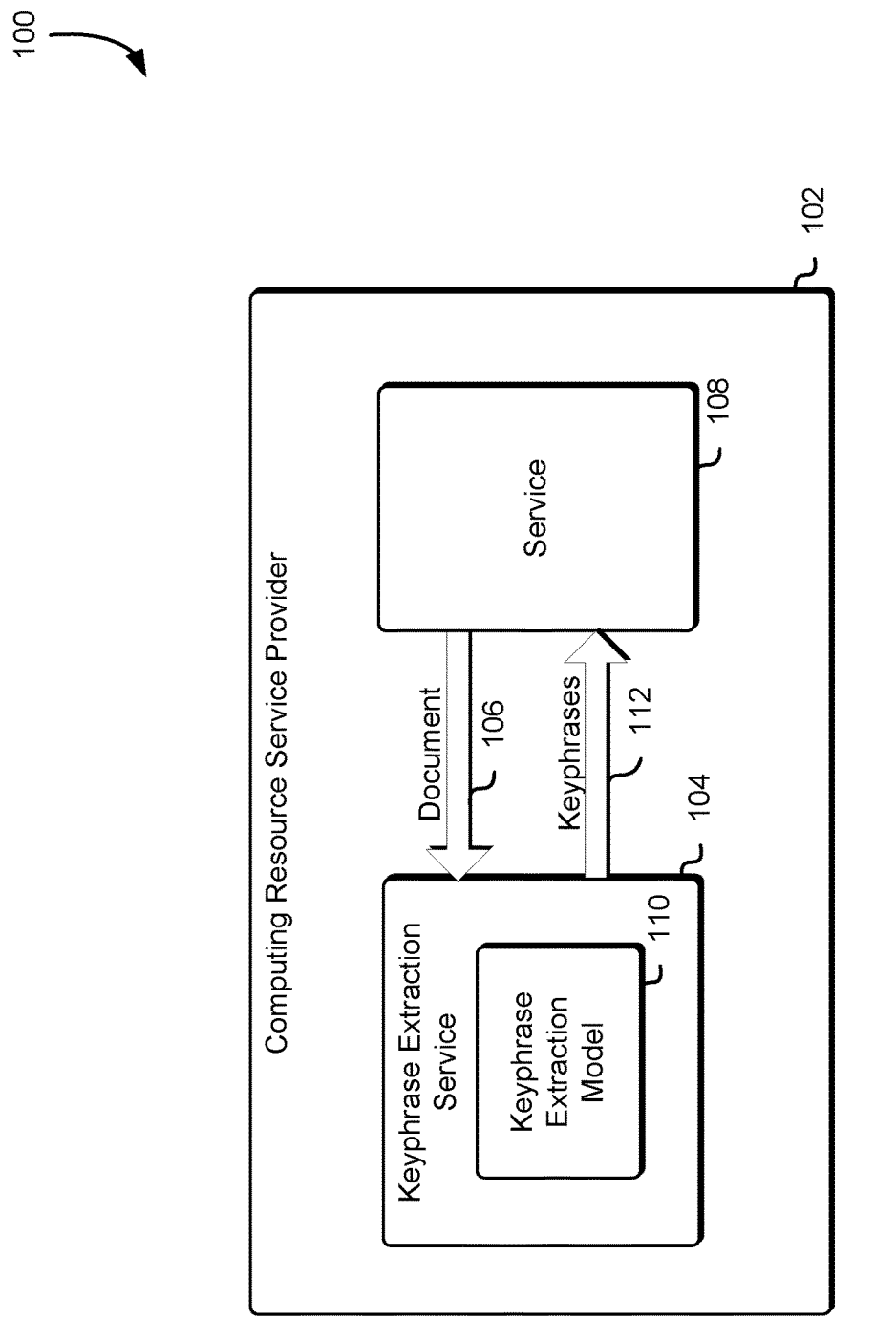
FIG. 1 illustrates a system where keyphrases are identified using a keyphrase extraction service, in accordance with one embodiment.

In one embodiment, keyphrase extraction is used to identify phrases in a document or other sequence of words that are representative of the content of the document or sequence of words. In one embodiment, keyphrase extraction is used to generate metadata associated with a document that can be used to summarize the document, can be used to retrieve information from the document, or can be used to answer questions about the content of the document. Typical approaches to keyphrase extraction focus on specific datasets, specific document types, and/or specific languages. In the preceding and following description, techniques for keyphrase extraction that are independent of the dataset, independent of the document type, and independent of language are described in relation to respective embodiments.

A keyphrase extraction service, in one embodiment, analyzes a sequence of words (e.g., from a document) using a stacked neural network model to learn and select relevant keyphrases from the document. The keyphrase extraction service first selects words from the document and, in one embodiment, the keyphrase extraction service selects the individual words from the document in sequence (e.g., in the order that the words are in the document). In one embodiment, the keyphrase extraction service selects the words from the document using an index to determine the order of the words in the document and selects the words from the document in reverse order. In one embodiment, the keyphrase extraction service selects the words from the document in random order and determines a sequence for the words using data and/or metadata associated with the document.

In one embodiment, the keyphrase extraction service analyzes the words to determine features of words in a document, which include, but are not limited to, character-level features and word-level features of the words as described herein. In one embodiment, the keyphrase extraction service analyzes the characters of the selected word. This analysis of the characters (i.e., character analysis) encodes the character-level features of the word (e.g., features of the word corresponding to each character in the word) using a neural model. In one embodiment, the keyphrase extraction service encodes character-level features using a bidirectional long short-term memory ("LSTM") model. A bidirectional LSTM model is a neural model that includes a forward LSTM model and a backward LSTM model, both described herein. A bidirectional LSTM model (also referred to herein as a "bidirectional LSTM") combines the results of a forward LSTM (e.g., an LSTM that iterates on the characters of the word from the beginning to the end of the word) with the results of a backward LSTM (e.g., an LSTM that iterates on the characters of the word from the end to the beginning) to encode the character-level features of the word.

In one embodiment, the keyphrase extraction service encodes character-level features using a convolutional neural network ("CNN") model. A CNN model (also referred to as a "CNN") is a neural model that includes multiple layers and links between elements in a layer as well as links between elements in different layers. A CNN locally combines the analysis of individual characters of a word with the analysis of nearby characters in the word (e.g., the previous and next characters) to encode the character-level features of the word.

The keyphrase extraction service, one embodiment, then combines the character-level features of the word with other features of the word to generate the word-level input features of the word. In one embodiment, the keyphrase extraction service combines the character-level features of the word with previously generated categorizations of the word taken from a word corpus or dictionary. In one embodiment, a word corpus is a structured set of text data that is used to inform statistical analysis on text data. In one embodiment, a word corpus is a single language word corpus. In one embodiment, a word corpus includes text data in multiple languages. Examples of word corpora include, but are not limited to, the Googlem Books NGram Corpus, the American National Corpus, and the Corpus of Contemporary American English (COCA). Such categorizations of the word denote parts of speech of the word (e.g., noun, verb, pronoun, adverb, etc.), common misspellings of the word, common associated words (e.g., other words that frequently appear with the word), common grammar errors associated with the word, synonyms of the word, antonyms of the word, and other such categorizations. In one embodiment, these categorizations are language and/or dialect dependent. In one embodiment, these categorizations are language and/or dialect independent.

In one embodiment, the keyphrase extraction service next analyzes the words of the document. This analysis of the words (i.e., word analysis) encodes the word-level features of the word (e.g., features of the word) from the word-level input features of the word using a neural model. In one embodiment, the keyphrase extraction service encodes word-level features of the word from the word-level input features of the word using a bidirectional LSTM. The bidirectional LSTM combines the results of a forward LSTM (e.g., an LSTM that iterates on the words from the beginning to the end of the document) with the results of a backward LSTM (e.g., an LSTM that iterates on the words from the end to the beginning of the document) to encode the word-level features of the word. In one embodiment, the keyphrase extraction service encodes word-level features of the document using a CNN. The CNN combines the analysis of individual words of the document with the analysis of nearby words of the document (e.g., the previous and next words) to encode the word-level features of the word.

In one embodiment, the keyphrase extraction service generates the tags (also referred to herein as "tag labels" and "labels") for the document. The tags for the document are generated by decoding the encoded word-level features of the document using a forward LSTM (e.g., an LSTM that iterates on the words from the beginning to the end of the document) where each tag and each word is used to generate succeeding tags. In one embodiment, the first tag is a specialized tag that indicates the start of the LSTM processing. In one embodiment, the first tag is based at least in part on a particular sequencing task (e.g., keyphrase extraction) associated with the LSTM.

In one embodiment, the keyphrase extraction service performs the keyphrase extraction by first using a bidirectional LSTM to encode the character-level features of the word, by next using a bidirectional LSTM to encode the word-level features of the word based at least in part on the encoded character-level features, and by next using an LSTM to decode the word-level features and to generate the tags for the word. In one embodiment, the keyphrase extraction service performs the keyphrase extraction by first using a CNN to encode the character-level features of the word, by next using a CNN to encode the word-level features of the word based at least in part on the encoded character-level features, and by next using an LSTM to decode the word-level features and to generate the tags for the word. In one embodiment, the keyphrase extraction service performs the keyphrase extraction by first using a bidirectional LSTM to encode the character-level features of the word, by next using a CNN to encode the word-level features of the word based at least in part on the encoded character-level features, and by next using an LSTM to decode the word-level features and to generate the tags for the word. In one embodiment, the keyphrase extraction service performs the keyphrase extraction by first using a CNN to encode the character-level features of the word, by next using a bidirectional LSTM to encode the word-level features of the word based at least in part on the encoded character-level features, and by next using an LSTM to decode the word-level features and to generate the tags for the word. In one embodiment, the keyphrase extraction service uses other neural models to encode the character-level features of the word, to encode the word-level features of the word, and/or to decode the word-level features and to generate the tags for the word.

In one embodiment, the keyphrase extraction service performs multiple sequencing tasks on the word of the document using the techniques described herein including, but not limited to, keyphrase extraction, part of speech tagging, position tagging, etc. In one embodiment, the keyphrase extraction service performs these multiple sequencing tasks in parallel (e.g., simultaneously). In one embodiment, the keyphrase extraction service performs these multiple sequencing tasks individually (e.g., not simultaneously). In one embodiment, the results of one sequencing task are used as inputs to another sequencing task (e.g., the results of a position tagging task are used as an input to a keyphrase extraction task).

In the preceding and following description, various techniques are described. For purposes of explanation, specific configurations and details are set forth in order to provide a thorough understanding of possible ways of implementing the techniques. However, it will also be apparent that the techniques described herein may be practiced in different configurations without the specific details. Furthermore, well-known features may be omitted or simplified to avoid obscuring the techniques being described.

FIG. 1 illustrates a system 100 where keyphrases are identified using a keyphrase extraction service in accordance with one embodiment. In the system 100 illustrated in FIG. 1, a keyphrase extraction service 104 operating within an environment of a computing resource service provider 102 receives a document 106 for keyphrase analysis. In the system 100 illustrated in FIG. 1, the document 106 is provided by a service 108 operating within the computing resource service provider 102 environment as described herein. In one embodiment, the document 106 is provided by a user, entity, or service operating outside of the computing resource service provider 102 environment. In one embodiment, the keyphrase extraction service 104 receives the document 106 and uses a keyphrase extraction model 110 to identify keyphrases 112 in the document 106. In the system 100 illustrated in FIG. 1, the keyphrase extraction service 104 provides the keyphrases 112 to the service 108 operating within the computing resource service provider 102 environment.

In one embodiment, the computing resource service provider 102 provides access to one or more host machines hosted by the computing resource service provider 102. In one embodiment, the computing resource service provider 102 provides access to one or more services in an environment therein. In one embodiment, the one or more services provided by the computing resource service provider 102 are implemented as and/or utilize one or more virtual machine instances that are operating on host machines operating within the computing resource service provider 102 environment. In one embodiment, the computing resource service provider 102 provides a variety of services to users and/or customers of the computing resource service provider 102 such as the service 108. In one embodiment, the users and/or customers of the computing resource service provider 102 communicate with the computing resource service provider 102 via an interface such as a web services interface. In one embodiment, each of the services operating in an environment of the computing resource service provider 102 (e.g., the keyphrase extraction service 104 and/or the service 108) has its own interface and, generally, subsets of the services can have corresponding interfaces in addition to or as an alternative to the single interface.

In one embodiment, a user interacts with services of the computing resource service provider (via appropriately configured and authenticated API requests) using a client computing device to provision and operate services that are instantiated on physical computing devices hosted and operated by the computing resource service provider 102 as described herein. These services are configured to manage resources (e.g., storage, processors, memory, network, etc.) associated with the services. These resources are used for various purposes, such as to operate as servers supporting a website, to operate business applications or, generally, to serve as computing power for the customer. Other applications of the services can support database applications, electronic commerce applications, business applications, and/or other such applications.

In one embodiment, the keyphrase extraction service 104 is a service provided by the computing resource service provider 102 to analyze text (e.g., the document 106) and identify keyphrases (e.g., the keyphrases 112) of the text using the techniques described herein. In one embodiment, the keyphrase extraction service 104 is a collection of computing resources that operate collectively to analyze text and identify keyphrases within the computing resource service provider 102 environment. These computing resources are configured to process requests to analyze text and identify keyphrases within the computing resource service provider 102 environment and include at least one of: computer systems (the computer systems including processors and memory), networks, storage devices, executable code, services, processes, modules, or applications. In one embodiment, the computing resources configured to analyze text and identify keyphrases within the computing resource service provider 102 environment include virtual systems that are implemented on shared hardware hosted by a computing resource service provider such as the computing resource service provider 102. In one embodiment, the keyphrase extraction service 104 is implemented as a single system. In one embodiment, the keyphrase extraction service 104 is implemented as a distributed system, with a plurality of instances operating collectively to analyze text and identify keyphrases within the computing resource service provider 102 environment. In one embodiment, the keyphrase extraction service 104 operates using computing resources (e.g., databases and/or virtual machine instances) that enable the keyphrase extraction service 104 to process requests to analyze text and identify keyphrases within the computing resource service provider 102 environment.

In one embodiment, the keyphrase extraction service 104 maintains data and/or metadata such that, when a request to analyze text and identify keyphrases of a document within the computing resource service provider 102 environment is received, the data and/or metadata is located, processed, and provided (or a streaming data object is initiated) for use in processing the request. In one embodiment, the data and/or metadata maintained by the keyphrase extraction service 104 is organized as data objects. In one embodiment, these data objects have arbitrary sizes. In one embodiment, these data objects have constraints on size or durability. Thus, the keyphrase extraction service 104 is configured to manage numerous data objects of varying sizes. In one embodiment, the keyphrase extraction service 104 stores the data objects in storage resources controlled by the keyphrase extraction service 104. In one embodiment, the keyphrase extraction service 104 stores the data objects using resources controlled by some other service such as a data storage service. In one embodiment, the keyphrase extraction service 104 stores the data objects using a combination of storage locations. In one embodiment, the keyphrase extraction service 104 operates as a key value store that associates the data objects with identifiers of the data objects that are used to retrieve or perform other operations in connection with the data objects. In one embodiment, the keyphrase extraction service 104 generates metadata associated with the data objects and causes such metadata to process requests to migrate data processing systems to the computing resource service provider 102 environment.

In one embodiment, the service 108 is a service that performs a variety of functions within the computing resource service provider 102 environment. The variety of functions performed by the service 108 includes, but is not limited to, data warehousing functions or applications, data processing functions or applications, data analysis functions or applications, data storage functions or applications, data security functions or applications, and data management functions or applications. In one embodiment, the service 108 is a service that performs this variety of functions and is hosted outside of the computing resource service provider 102 environment. In one embodiment, the service 108 is hosted in an environment provided by a customer of the computing resource service provider 102. In one embodiment, the service 108 is hosted in an environment provided by a third party (e.g., neither the customer of the computing resource service provider 102 nor the computing resource service provider 102).

In one embodiment, the document 106 is a text document such as a book or a research paper with a large number of words (e.g., in excess of a thousand words). In one embodiment, the document 106 is a shorter document such as an advertisement, a blog post, a product review, or a user comment with a smaller number of words (e.g., between fifty and a thousand words). In one embodiment, the document 106 is a very short document such as a log entry or a "Tweet" with less than fifty words. In one embodiment, the document 106 contains a mixture of text and non-text data. In one embodiment, the document 106 contains text that is in a single language and/or in a single dialect. In one embodiment, the document 106 contains text that is in multiple languages and/or dialects. In one embodiment, the document 106 contains text that is structured according to a defined structure (e.g., computer source code). In one embodiment, the document 106 contains text that is unstructured. In one embodiment, the document 106 is provided to the keyphrase extraction service 104 using a link to a data storage service such as the data storage services described herein.

Figure 2:
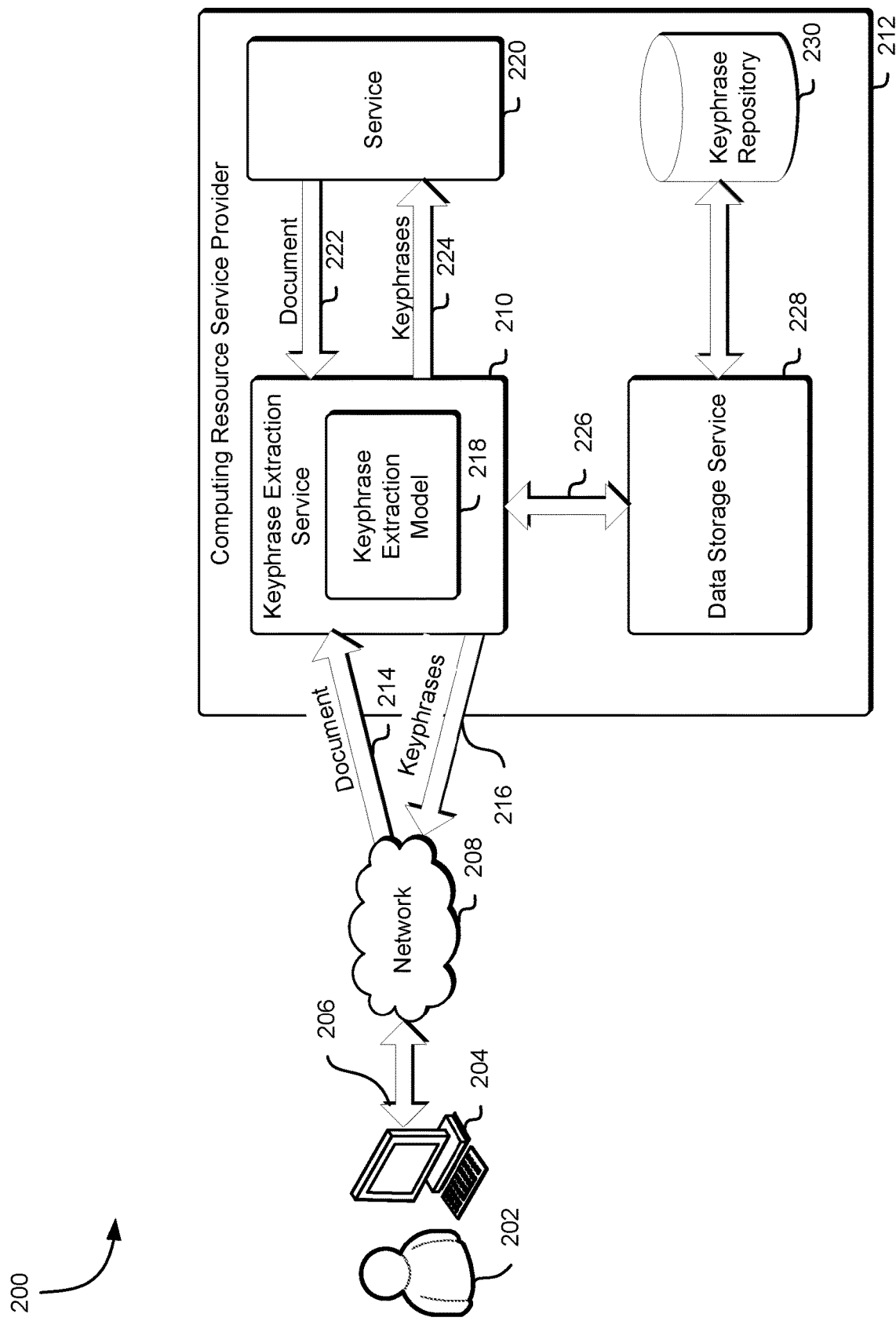
FIG. 2 illustrates a system where keyphrases are identified and stored using a keyphrase extraction service, in accordance with one embodiment.

FIG. 2 illustrates a system 200 where keyphrases are identified and stored using a keyphrase extraction service as described in connection with FIG. 1 and in accordance with one embodiment. In the system 200 illustrated in FIG. 2, a keyphrase extraction service 210 operating within an environment of a computing resource service provider 212 receives a document 222 for keyphrase analysis that is provided by a service 220 operating within the computing resource service provider 212 environment as described above in connection with FIG. 1. In one embodiment, the keyphrase extraction service 210 receives the document 222 and uses a keyphrase extraction model 218 to identify keyphrases 224 in the document 222. In the system 200 illustrated in FIG. 2, the keyphrase extraction service 210 provides the keyphrases 224 to the service 220 operating within the computing resource service provider 212 environment also as described above in connection with FIG. 1.

In the example illustrated in FIG. 2, the keyphrase extraction service 210 operating within the environment of a computing resource service provider 212 receives a document 214 for keyphrase analysis that is provided by a user 202 associated with the computing resource service provider 212 using a client computing device 204 that connects 206 to the keyphrase extraction service 210 of the computing resource service provider 212 via a network 208. In one embodiment, the keyphrase extraction service 210 receives the document 214 and uses a keyphrase extraction model 218 to identify keyphrases 216 in the document 214. In the system 200 illustrated in FIG. 2, the keyphrase extraction service 210 provides the keyphrases 216 to the client computing device 204 of the user 202 using the network 208.

In the system 200 illustrated in FIG. 2, the user 202 (also referred to herein as a "customer") is a user associated with the computing resource service provider 212 that begins the process of analyzing text and identifying keyphrases of a document by issuing a command to begin the analysis of the text from the client computing device 204. In one embodiment, the command to begin the analysis of the text is generated by the user 202 of the computing resource service provider 212 who uses the client computing device 204 to connect to a variety of services provided by the computing resource service provider 212 as described herein. In one embodiment, the user 202 uses the client computing device 204 to connect to the computing resource service provider 212 over a network 208 such as those networks described herein. As described herein, a computing resource service provider 212 provides a distributed, virtualized, and/or datacenter environment within which one or more applications, processes, services, virtual machines, and/or other such computer system entities are executed. In one embodiment, the user 202 is a process running on one or more remote computer systems controlled by a customer of the computing resource service provider 212.

In one embodiment, commands to the computing resource service provider 212 to analyze text and identify keywords originate from an outside computer system. In one embodiment, commands to the computing resource service provider 212 originate from within the computing resource service provider 212 environment. In one embodiment, the commands to connect to the computing resource service provider 212 are sent to the computing resource service provider 212 and/or to other services operating in the environment therein, without the direct intervention of the user 202 (i.e., commands to connect to the computing resource service provider 212 are generated automatically in response to one or more events). In one embodiment, the user 202 connects to the computing resource service provider 212 environment using a privileged user account associated with the customer of the computing resource service provider 212. In one embodiment, the user 202 uses a privileged user account associated with and/or provided by the computing resource service provider 212 to connect to the computing resource service provider 212 environment.

In the system 200 illustrated in FIG. 2, the keyphrases 216 and/or the keyphrases 224 are provided 226 to a data storage service 228 and stored in a keyphrase repository 230. In one embodiment, the keyphrases 216 and/or the keyphrases 224 are provided 226 to the data storage service 228 and stored in the keyphrase repository 230, in addition to being provided to the service 220 and/or the client computing device 204 of the user 202. In one embodiment, the keyphrases 216 and/or the keyphrases 224 are provided 226 to the data storage service 228 and stored in the keyphrase repository 230 as an alternative to being provided to the service 220 and/or the client computing device 204 of the user 202 (e.g., the keyphrases 216 and/or the keyphrases 224 are stored and/or provided according to a system configuration of the keyphrase extraction service 210). In one embodiment, the keyphrases provided 226 to the data storage service 228 and stored in the keyphrase repository 230 include additional data and/or metadata linking the keyphrases to the document (e.g., linking the keyphrases 216 to the document 214) that is stored in the keyphrase repository 230.

In one embodiment, the data storage service 228 is a service provided by the computing resource service provider 212 to store data associated with analyzing text and identifying keyphrases of the text using the techniques described herein. In one embodiment, the data storage service 228 is a collection of computing resources that operate collectively to analyze text and identify keyphrases within the computing resource service provider 212 environment. These computing resources are configured to store data related to requests to analyze text and identify keyphrases within the computing resource service provider 212 environment and include at least one of: computer systems (the computer systems including processors and memory), networks, storage devices, executable code, services, processes, modules, or applications. In one embodiment, the computing resources configured to store data related to requests to analyze text and identify keyphrases within the computing resource service provider 212 environment include virtual systems that are implemented on shared hardware hosted by a computing resource service provider such as the computing resource service provider 212. In one embodiment, the data storage service 228 is implemented as a single system. In one embodiment, the data storage service 228 is implemented as a distributed system, with a plurality of instances operating collectively to store data related to requests to analyze text and identify keyphrases within the computing resource service provider 212 environment. In one embodiment, the data storage service 228 operates using computing resources (e.g., databases and/or virtual machine instances) that enable the data storage service 228 to process requests to store data related to requests to analyze text and identify keyphrases within the computing resource service provider 212 environment. In one embodiment, the data related to requests to analyze text and identify keyphrases within the computing resource service provider 212 environment includes the requests, the text, the keyphrases, parameters used by the keyphrase extraction model 218 to analyze the text, metadata associated with the request to analyze the text, or other such data.

In one embodiment, the data storage service 228 maintains data and/or metadata such that, when a request to analyze text and identify keyphrases of a document within the computing resource service provider 212 environment is received, the data and/or metadata is located, processed, and provided (or a streaming data object is initiated) for use in processing the request. In one embodiment, the data and/or metadata maintained by the data storage service 228 is organized as data objects. In one embodiment, these data objects have arbitrary sizes. In one embodiment, these data objects have constraints on size or durability. Thus, the data storage service 228 is configured to manage numerous data objects of varying sizes. In one embodiment, the data storage service 228 stores the data objects in storage resources controlled by the data storage service 228 (e.g., the keyphrase repository 230). In one embodiment, the data storage service 228 stores the data objects using resources controlled by some other service such as a database service. In one embodiment, the data storage service 228 stores the data objects using a combination of storage locations. In one embodiment, the data storage service 228 operates as a key value store that associates the data objects with identifiers of the data objects that are used to retrieve or perform other operations in connection with the data objects. In one embodiment, the data storage service 228 generates metadata associated with the data objects and causes such metadata to process requests to migrate data processing systems to the computing resource service provider 212 environment.

Figure 3:
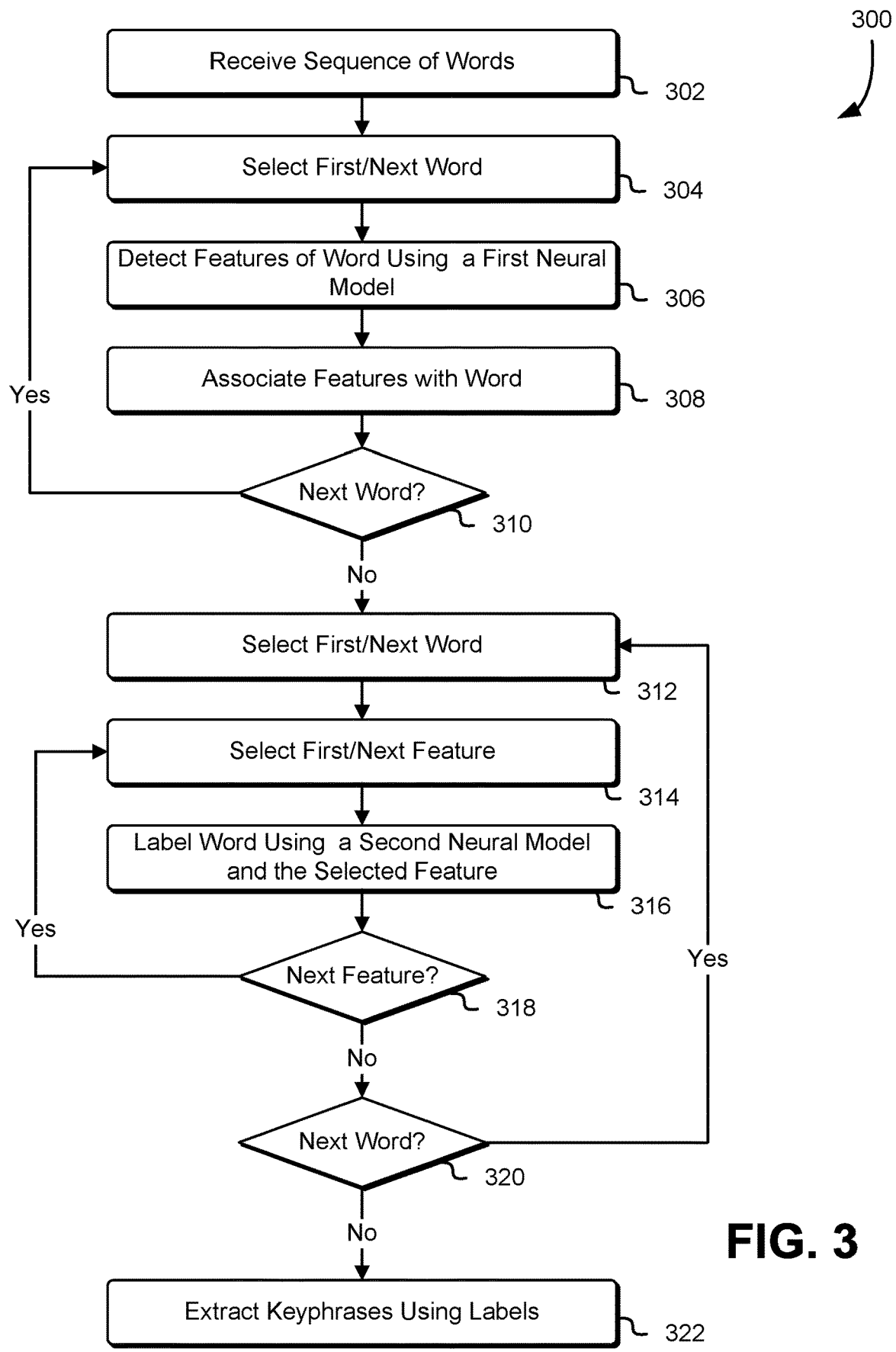
FIG. 3 illustrates a process for identifying keyphrases using a keyphrase extraction service, in accordance with one embodiment.

FIG. 3 illustrates a process 300 for identifying keyphrases using a keyphrase extraction service as described in connection with FIG. 1 and in accordance with one embodiment. In one embodiment, a keyphrase extraction service such as the keyphrase extraction service 104 described in connection with FIG. 1 performs the process 300 described in connection with FIG. 3. In one embodiment, the keyphrase extraction service receives 302 a sequence of words and selects 304 the first/next word. In one embodiment, the keyphrase extraction service detects 306 the features of the selected word using a first neural model. In one embodiment, the first neural model is a bidirectional LSTM. In one embodiment, the first neural model is a CNN. In one embodiment, the keyphrase extraction service associates 308 the detected features with the word. The keyphrase extraction service then determines 310 if there is a next word in the sequence of words to select.

In one embodiment, if the keyphrase extraction service determines 310 that there is a next word in the sequence of words to select, the keyphrase extraction service selects 304 the next word and detects 306 the features of that word. In one embodiment, if the keyphrase extraction service determines 310 that there is not a next word in the sequence of words to select, the keyphrase extraction service starts again at the beginning of the sequence and selects 312 the first/next word. In one embodiment, the keyphrase extraction service selects 314 the first/next feature of the selected word and labels 316 the word to produce one or more labels of features of words using a second neural network model based at least in part on the selected feature. In one embodiment, the second neural model is an LSTM. In one embodiment, the labels of features of words of the document include labels associated with keyphrase extends such as beginning of keyphrase (e.g., the first word of a keyphrase), inside keyphrase (e.g., a word inside a keyphrase that is not the beginning of keyphrase or end of keyphrase), end of keyphrase (e.g., the last word of a keyphrase), singleton keyphrase (e.g., a keyphrase that is a single word), or outside of keyphrase (e.g., a word that is not part of a keyphrase). The keyphrase extraction service next determines 318 if there is a next feature to select.

In one embodiment, if the keyphrase extraction service determines 318 that there is a next feature to select, the keyphrase extraction service selects 314 the next feature. In one embodiment, if the keyphrase extraction service determines 318 that there is not a next feature to select, the keyphrase extraction service determines 320 if there is a next word to select. In one embodiment, if the keyphrase extraction service determines 320 that there is a next word to select, the keyphrase extraction service selects 312 the next word. In one embodiment, if the keyphrase extraction service determines 320 that there is not a next word to select, the keyphrase extraction service extracts 322 the keyphrases for the sequence of words using the labeled words.

Figure 4:
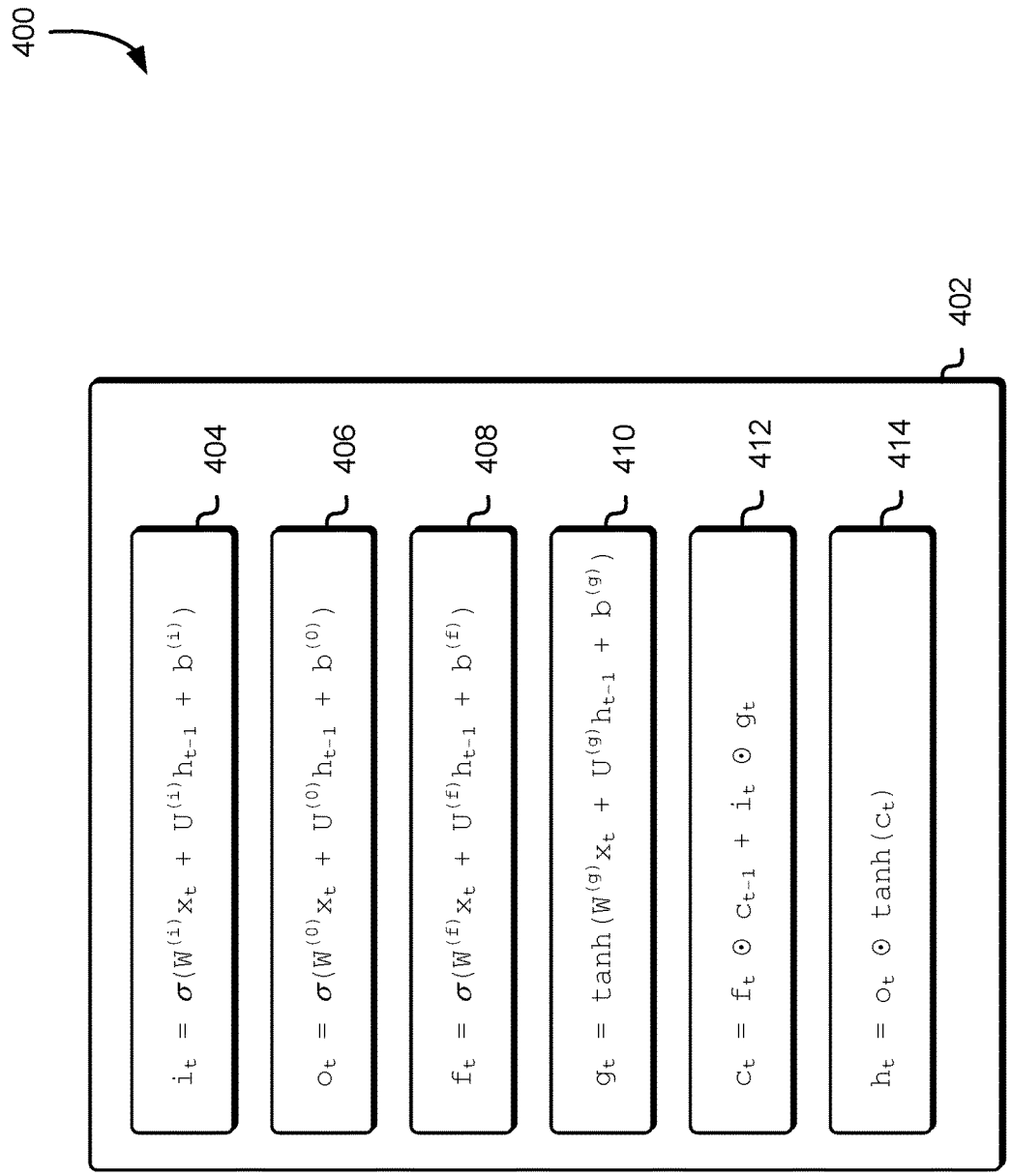
FIG. 4 illustrates a diagram of a long short-term memory model usable to identify keyphrases using a keyphrase extraction service, in accordance with one embodiment.

FIG. 4 illustrates a diagram 400 of a long short-term memory model usable to identify keyphrases using a keyphrase extraction service as described in connection with FIG. 1 and in accordance with one embodiment. The diagram 400 shows the equations 402 of a forward LSTM, which is a LSTM that processes a set of data from the start of the data to the end of the data. Given a sequence of data $x_1, x_2, \ldots, x_n$, an LSTM iteratively computes (or encodes) the hidden state $h_t$ at step t using the equations illustrated.

In the diagram 400, equation 404 is "$i_t = \sigma(W^{(i)} x_t + U^{(i)} h_{t-1} + b^{(i)})$" which computes the input gate for the LSTM that represents a parameter for the LSTM related to acquiring new information.

In the equations 402 of the forward LSTM, $\sigma$ is a sigmoid activation function, tanh is a hyperbolic tangent activation function, $\odot$ is an element-wise product operator, and W, U, and b are learnable parameters of the LSTM. Also in the equations 402 of the forward LSTM, $x_t$ is the element being analyzed (e.g., the character or word) and $h_{t-1}$ is the hidden state of the previous element (e.g., the hidden state of element $x_{t-1}$). In one embodiment, the previous element is the previous letter in the word, as described herein. In one embodiment, the previous element is the previous word in the sequence of words, as described herein.

In the diagram 400, equation 406 is "$o_t = \sigma(W^{(o)} x_t + U^{(o)} h_{t-1} + b^{(o)})$" which computes the output gate for the LSTM that represents a parameter for the LSTM related to outputting new information.

In the diagram 400, equation 408 is "$f_t = \sigma(W^{(f)} x_t + U^{(f)} h_{t-1} + b^{(f)})$" which computes the forget gate for the LSTM that represents a parameter for the LSTM related to forgetting (e.g., discarding) previously acquired information.

In the diagram 400, equation 410 is "$g_t = \tanh(W^{(g)} x_t + U^{(g)} h_{t-1} + b^{(g)})$" which computes the pre-activation state for the LSTM that represents a parameter usable for computing the hidden state, described below.

In the diagram 400, equation 412 is "$c_t = f_t \odot c_{t-1} + i_t \odot g_t$" which computes the cell state for the LSTM. Equation 412 is based on the results of equation 404, equation 408, and equation 410, and is also based on the previous result of equation 412.

In the diagram 400, equation 414 is "$h_t=o_t \odot \tanh(c_t)$" which computes the hidden state for the LSTM. Equation 414 is based on the result of equation 406 and the result of equation 412. The hidden state of the LSTM is the encoded result for the LSTM for the particular data type.

As described above, the diagram 400 shows the equations 402 of a forward LSTM, which is a LSTM that processes a set of data from the start of the data to the end of the data. In various techniques described herein, both forward LSTM models and backward LSTM models (e.g., a LSTM that processes a set of data from the end of the data to the beginning of the data) are used. The equations for a backward LSTM are "$i_t=\sigma(W^{(i)}x_t+U^{(i)}h_{t+1}+b^{(i)})$" (corresponding to equation 404), "$o_t=\sigma(W^{(o)}x_t+U^{(o)}h_{t+1}+b^{(o)})$" (corresponding to equation 406), "$f_t=\sigma(W^{(f)}x_t+U^{(f)}h_{t+1}+b^{(f)})$" (corresponding to equation 408), and "$g_t=\tanh(W^{(g)}x_t+U^{(g)}h_{t+1}+b^{(g)})$" (corresponding to equation 410). Equations "$c_t=f_t \odot c_{t-1}+i_t \odot g_t$" and "$h_t=o_t \odot \tanh(c_t)$" (e.g., equation 412 and equation 414) are the same in both the forward LSTM and the backward LSTM.

Figure 5:
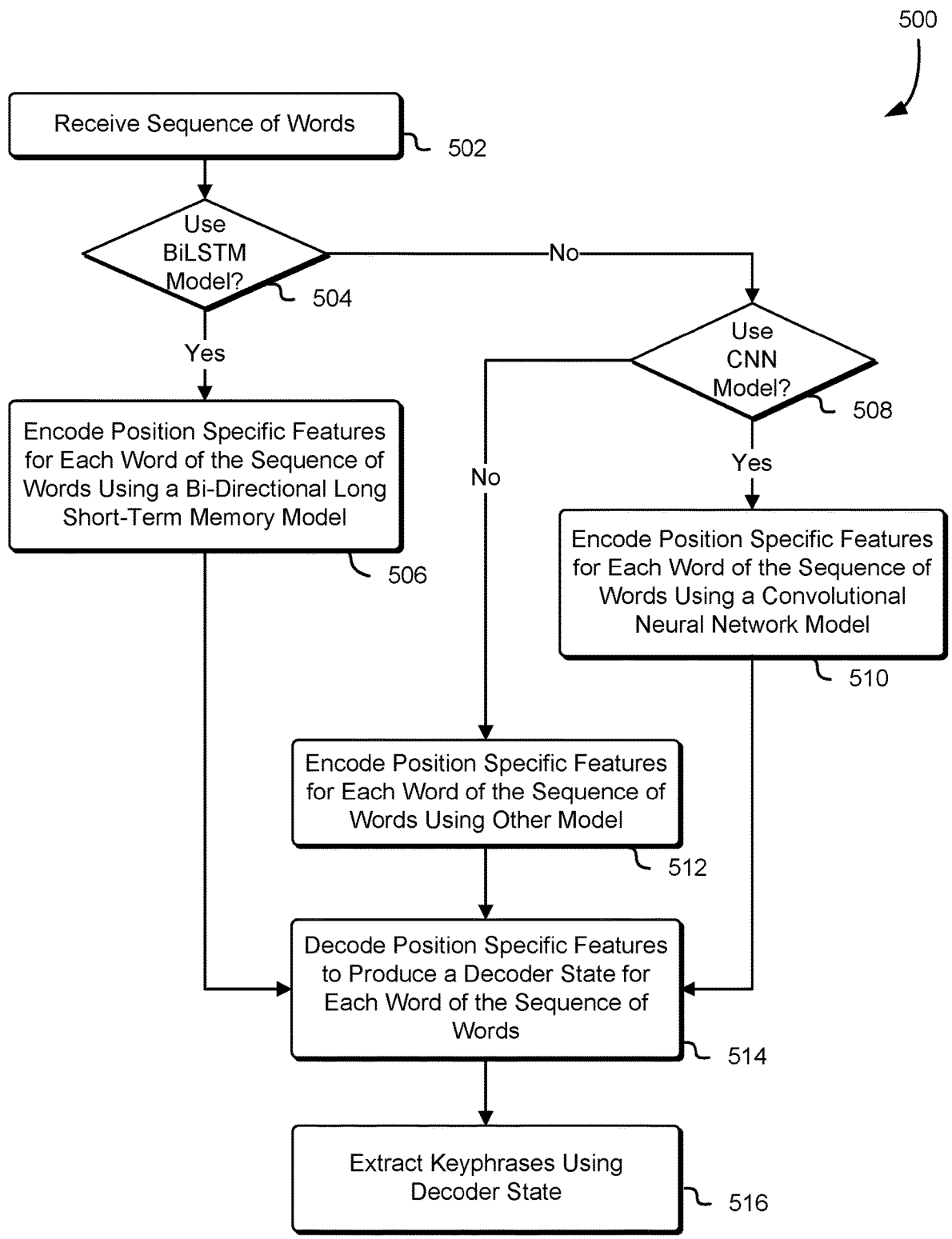
FIG. 5 illustrates a process for selecting a model usable to identify keyphrases using a keyphrase extraction service, in accordance with one embodiment.

FIG. 5 illustrates a process 500 for selecting a model usable to identify keyphrases using a keyphrase extraction service as described in connection with FIG. 1 and in accordance with one embodiment. In one embodiment, a keyphrase extraction service such as the keyphrase extraction service 104 described in connection with FIG. 1 performs the process 500 described in connection with FIG. 5. In one embodiment, the keyphrase extraction service receives 502 a sequence of words.

In one embodiment, the keyphrase extraction service determines 504 whether to use a bidirectional LSTM ("BiLSTM") model to encode the word-level features of the sequence of words. In one embodiment, a BiLSTM includes a forward LSTM that analyzes data from the beginning of the data to the end of the data and a backward LSTM that analyzes data from the end of the data to the beginning of the data. In one embodiment, if the keyphrase extraction service determines 504 to use a BiLSTM model to encode the word-level features, the keyphrase extraction service encodes 506 position specific features for each word of the sequence of words using the BiLSTM model, decodes 514 the position specific features to produce a decoder state for each word of the sequence of words, and extracts 516 keyphrases from the sequence of words using the decoder states.

In one embodiment, the keyphrase extraction service decodes 514 the position specific features to produce a decoder state for each word of the sequence using an LSTM. In one embodiment, the keyphrase extraction service decodes 514 the position specific features to produce a decoder state for each word of the sequence using an BiLSTM. In one embodiment, the keyphrase extraction service decodes 514 the position specific features to produce a decoder state for each word of the sequence using a CNN. In one embodiment, the keyphrase extraction service decodes 514 the position specific features to produce a decoder state for each word of the sequence using another neural model (e.g., a gated recurrent unit).

In one embodiment, if the keyphrase extraction service determines 504 not to use a BiLSTM model to encode the word-level features of the sequence of words, the keyphrase extraction service determines 508 whether to use a CNN model to encode the word-level features of the sequence of words. In one embodiment, if the keyphrase extraction service determines 508 to use a CNN model to encode the word-level features of the sequence of words, the keyphrase extraction service encodes 510 position specific features for each word of the sequence of words using the CNN model, decodes 514 the position specific features to produce a decoder state for each word of the sequence of words as described herein, and extracts 516 keyphrases from the sequence of words using the decoder states.

In one embodiment, if the keyphrase extraction service determines 508 not to use a CNN model to encode the word-level features of the sequence of words, the keyphrase extraction service encodes 512 position specific features for each word of the sequence of words using another model, decodes 514 the position specific features to produce a decoder state for each word of the sequence of words as described herein, and extracts 516 keyphrases from the sequence of words using the decoder states. In one embodiment, the other model is a gated recurrent unit ("GRU").

Figure 6:
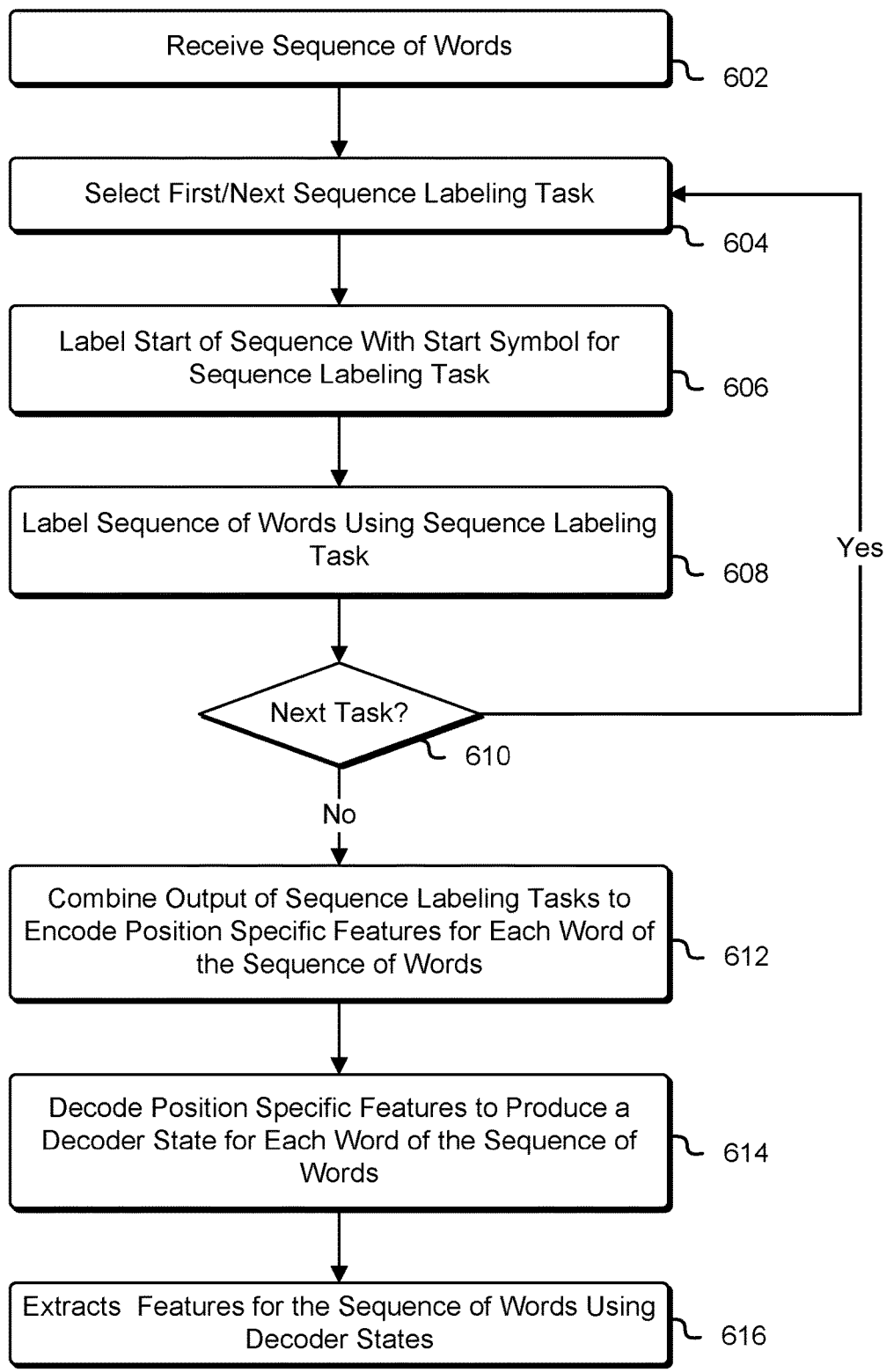
FIG. 6 illustrates a process for performing multiple sequencing tasks to identify keyphrases using a keyphrase extraction service, in accordance with one embodiment.

FIG. 6 illustrates a process 600 for performing multiple sequencing tasks to identify keyphrases using a keyphrase extraction service as described in connection with FIG. 1 and in accordance with one embodiment. In one embodiment, a keyphrase extraction service such as the keyphrase extraction service 104 described in connection with FIG. 1 performs the process 600 described in connection with FIG. 6. In one embodiment, the keyphrase extraction service receives 602 a sequence of words. In one embodiment, the keyphrase extraction service selects 604 the first/next sequence labeling task from one or more sequence labeling tasks. In one embodiment, the sequence labeling task is keyphrase extraction. In one embodiment, the sequence labeling task is position tagging. In one embodiment, the sequence labeling task is part of speech tagging (e.g., to label the word as a noun, verb, adverb, adjective, pronoun, etc.). In one embodiment, part of speech tagging includes tagging of multiple words (e.g., tagging "President of the United States" as a noun phrase).

In one embodiment, the keyphrase extraction service labels 606 the start of the sequence with a start symbol associated with the sequence labeling task as described herein. In one embodiment, the keyphrase extraction service labels 608 each of the words in the sequence of words according to the sequence labeling task. In one embodiment, the keyphrase extraction service determines 610 if there are more sequence labeling tasks to perform. In one embodiment, if the keyphrase extraction service determines 610 that there are more sequence labeling tasks to perform, the keyphrase extraction service selects 604 the next sequence labeling task to perform.

In one embodiment, if the keyphrase extraction service determines 610 that there are no more sequence labeling tasks to perform, the keyphrase extraction service combines 612 the output of the sequence labeling tasks to encode position-specific features for each word of the sequence of words, decodes 614 the position specific features to produce a decoder state for each word of the sequence of words, and extracts 616 features for the sequence of words using the decoder states. In one embodiment, the keyphrase extraction service decodes 614 the position specific features to produce a decoder state for each word of the sequence using an LSTM. In one embodiment, the keyphrase extraction service decodes 614 the position specific features to produce a decoder state for each word of the sequence using a BiLSTM. In one embodiment, the keyphrase extraction service decodes 614 the position specific features to produce a decoder state for each word of the sequence using a CNN. In one embodiment, the keyphrase extraction service decodes 614 the position specific features to produce a decoder state for each word of the sequence using another neural model (e.g., a GRU). In one embodiment, the features are keyphrases. In one embodiment, the keyphrase extraction service extracts multiple features for each word of the sequence of words.

Figure 7:
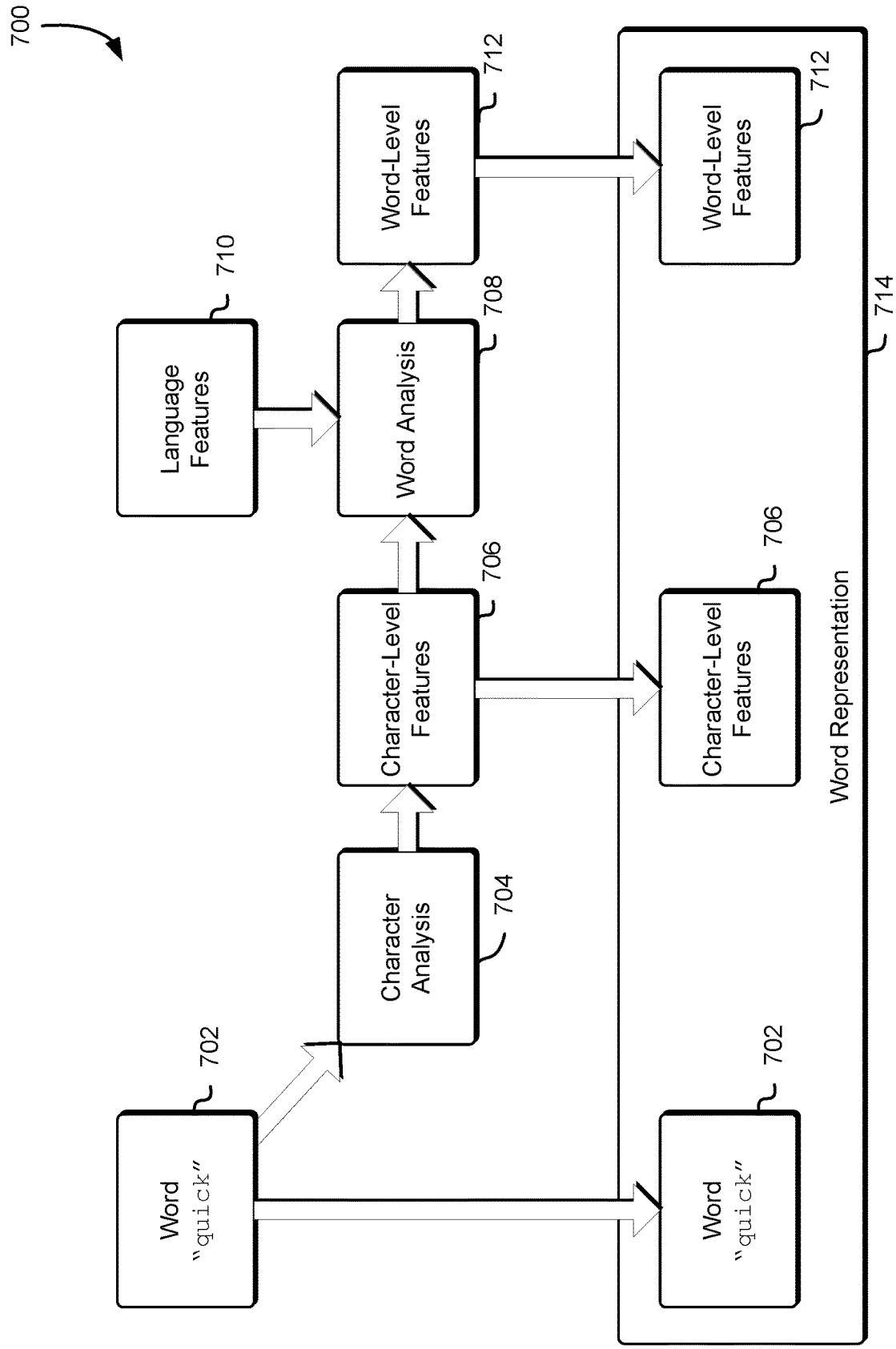
FIG. 7 illustrates a system where a word representation is generated using a keyphrase extraction service, in accordance with one embodiment.

FIG. 7 illustrates a system 700 where a word representation is generated using a keyphrase extraction service as described in connection with FIG. 1 and in accordance with one embodiment. In the system 700 illustrated in FIG. 7, a word 702 ("quick") is provided for character analysis 704 using techniques described herein. The character analysis 704 extracts character-level features 706, which are then provided for word analysis 708 using techniques described herein to extract word-level features 712 from the word. In one embodiment, the word analysis 708 uses language features 710 such as a word corpus (or dictionary) or a word gazetteer to perform the word analysis 708. In one embodiment, the language features 710 include language specific features (e.g., are features specific to the English language).

In one embodiment, a word gazetteer is a set of additional information about words that represent classifications of the words according to various classes. In one embodiment, a word gazetteer is created from one or more existing data sets of words. In one embodiment, a word gazetteer includes, as a class, a set of proper names that can be generated from a list of proper names from, for example, a Wikipedia page. In one embodiment, a word gazetteer can include, as a class, a set of business names that can be generated from, for example, Yelp® pages. In one embodiment, a word gazetteer is generated based at least in part on a word corpus such as those described herein. In one embodiment, a word gazetteer and/or a word corpus includes phrases of multiple words (e.g., "President of the United States"). In one embodiment, the neural models for keyphrase extraction described herein treat such phrases of multiple words as single words for the purposes of analysis.

In one embodiment, word 702 is combined with the character-level features 706 and/or with the word-level features 712 to produce a word representation 714 that includes an aggregate of the extracted features. Use of a word representation such as the word representation 714 is described in detail below.

Figure 8:
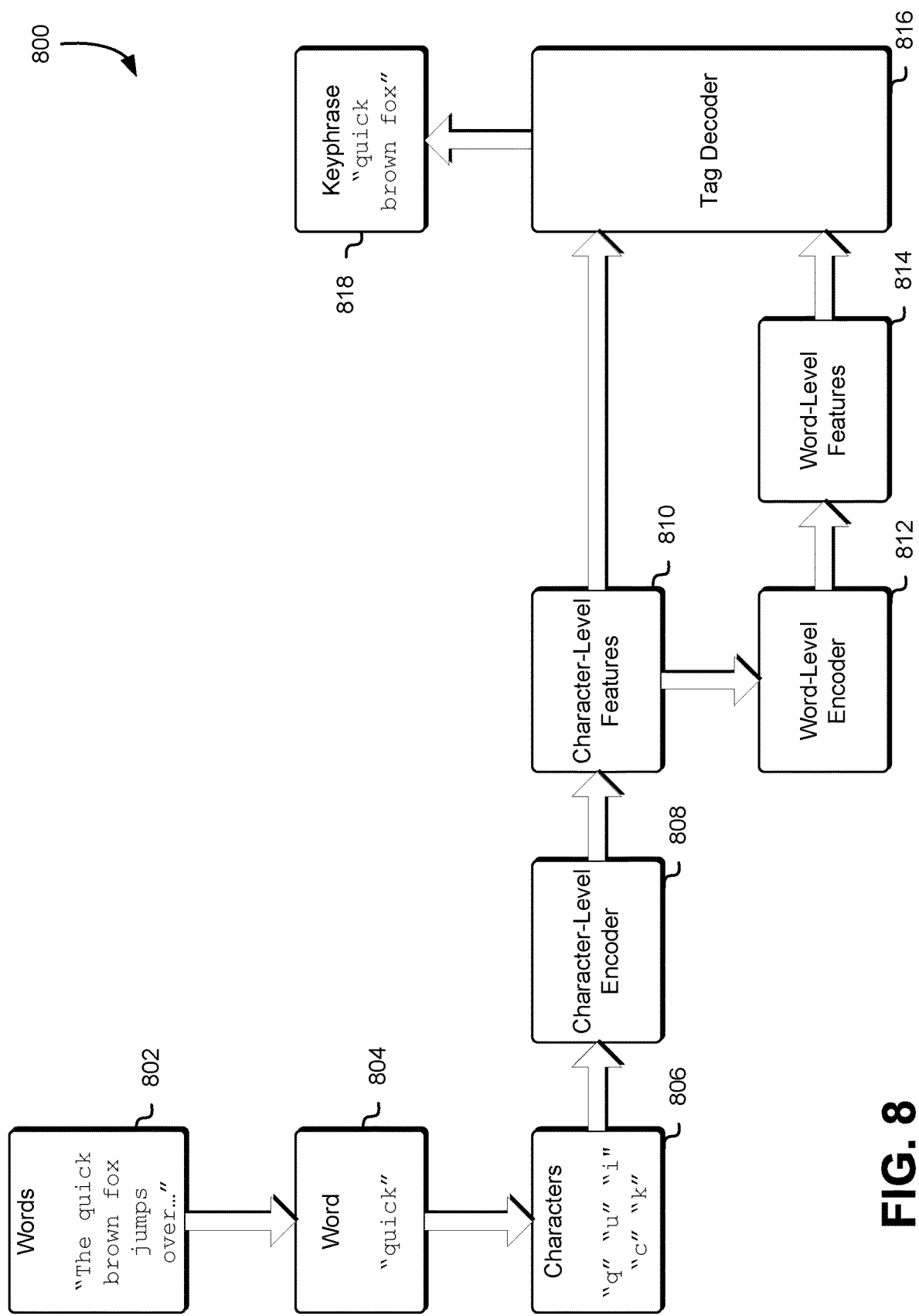
FIG. 8 illustrates a system where a word is encoded with features and the features are decoded to produce tag labels usable to identify a keyphrase using a keyphrase extraction service, in accordance with one embodiment.

FIG. 8 illustrates a system 800 where a word is encoded with features and the features are decoded to produce tag labels usable to identify a keyphrase using a keyphrase extraction service as described in connection with FIG. 1 and in accordance with one embodiment. In the system 800 illustrated in FIG. 8, a set of words 802 (e.g., "The quick brown fox jumps over . . . ") is provided for keyphrase extraction. In one embodiment, the set of words 802 is a sequence of words with a prescribed sequential order. In one embodiment, a word 804 (e.g., "quick") of the set of words 802 is selected for analysis as part of the keyphrase extraction. In one embodiment, the characters 806 (e.g., "q" "u" "i" "c" "k") of the word 804 are selected for character-level encoding as described herein.

In one embodiment, a character-level encoder 808 uses techniques described herein to extract character-level features 810 from the characters 806 of the word 804. In one embodiment, the character-level features 810 from the characters 806 of the word 804 are provided to a word-level encoder 812 that extracts the word-level features 814 of the word. In one embodiment, the word 804 is provided to the word-level encoder 812 in addition to the character-level features 810. In one embodiment, the characters 806 are provided to the word-level encoder 812 in addition to the character-level features 810.

In one embodiment, the character-level features 810 and the word-level features 814 are provided to a tag decoder 816 that generates a set of tags (also referred to herein as tag labels) for the words 802, which are used to identify the keyphrase 818 (e.g., "quick brown fox") in the set of words 802 using the techniques described herein.

Figure 9:
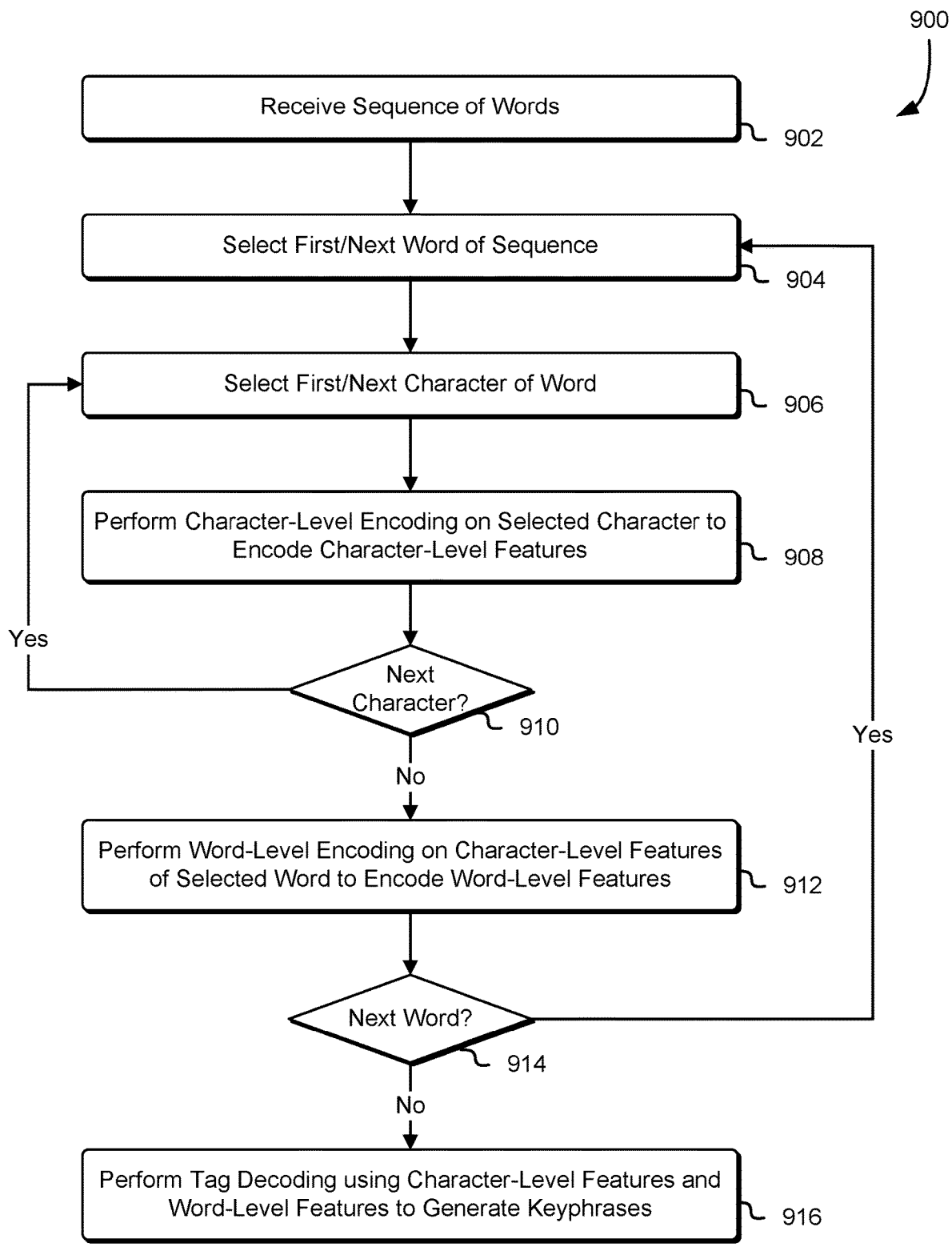
FIG. 9 illustrates a process for doing hierarchical encoding to encode a word with features that are decoded to produce tag labels usable to identify a keyphrase using a keyphrase extraction service, in accordance with one embodiment.

FIG. 9 illustrates a process 900 for doing hierarchical encoding to encode a word with features that are decoded to produce tag labels usable to identify a keyphrase using a keyphrase extraction service as described in connection with FIG. 1 and in accordance with one embodiment. In one embodiment, a keyphrase extraction service such as the keyphrase extraction service 104 described in connection with FIG. 1 performs the process 900 described in connection with FIG. 9. In one embodiment, the keyphrase extraction service receives 902 a sequence of words. In one embodiment, the keyphrase extraction service selects 904 a first/next word from the sequence of words. In one embodiment, the keyphrase extraction service selects 906 the first/next character of the selected word. In one embodiment, the keyphrase extraction service performs 908 character-level encoding using the selected character to encode character-level features for the selected character using techniques described herein.

In one embodiment, the keyphrase extraction service determines 910 whether there are any remaining characters in the word to encode. In one embodiment, if the keyphrase extraction service determines 910 that there are remaining characters in the word to encode, the keyphrase extraction service selects 906 the next character of the word. In one embodiment, if the keyphrase extraction service determines 910 that there are no remaining characters in the word to encode, the keyphrase extraction service performs 912 word-level encoding on the character-level features of the selected word to encode word-level features for the selected word as described herein. In one embodiment, the keyphrase extraction service determines 914 whether there are any remaining words to encode. If the keyphrase extraction service determines 914 that there are remaining words to encode, the keyphrase extraction service selects 904 the next word. In one embodiment, if the keyphrase extraction service determines 914 that there are not any remaining words to encode, the keyphrase extraction service performs 916 tag decoding using the character-level features and the word-level features to generate keyphrases for the sequence of words as described herein.

Figure 10:
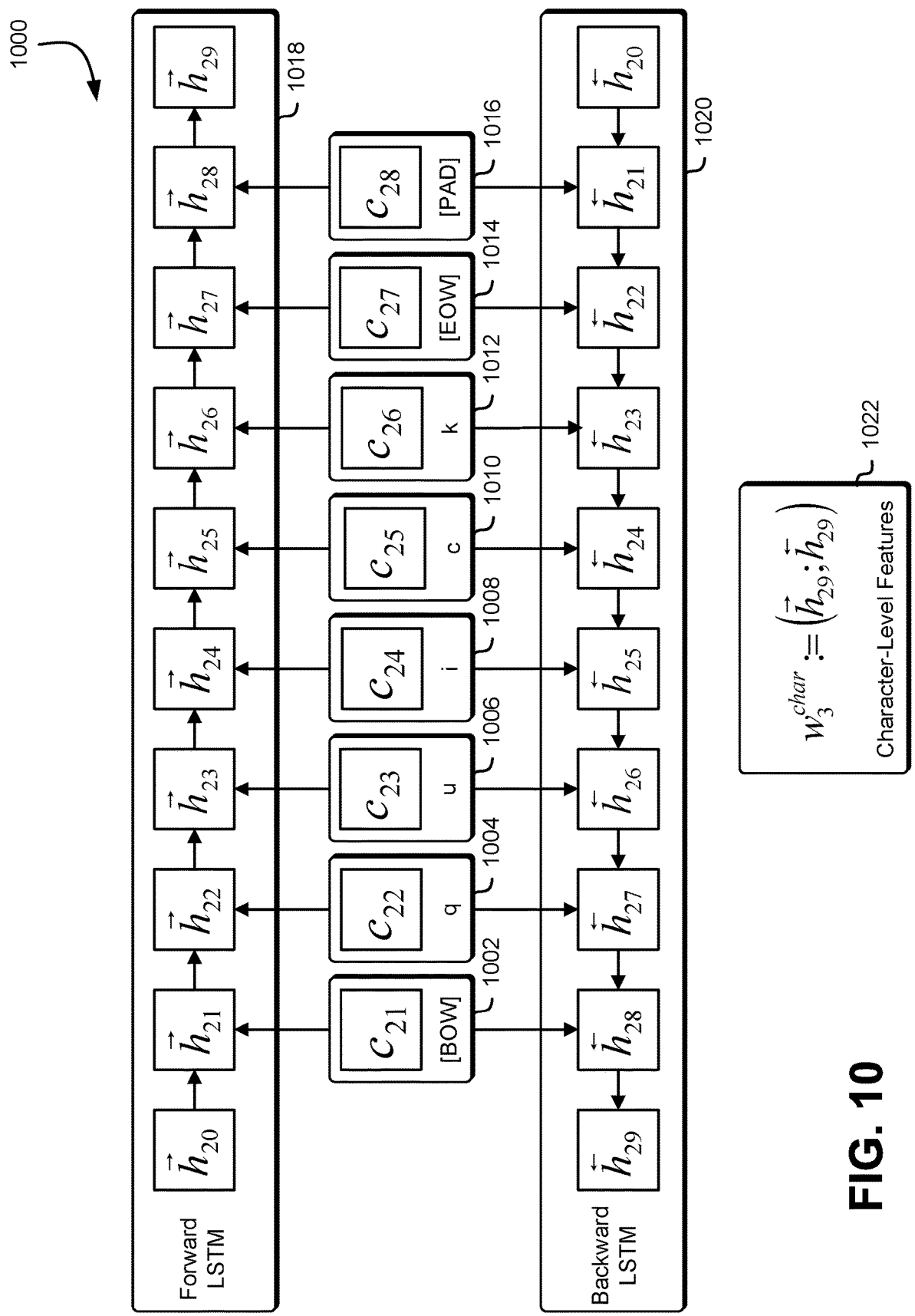
FIG. 10 illustrates a system where character encoding is performed with a bidirectional long short-term memory model using a keyphrase extraction service, in accordance with one embodiment.

FIG. 10 illustrates a system 1000 where character encoding is performed with a bidirectional long short-term memory model using a keyphrase extraction service as described in connection with FIG. 1 and in accordance with one embodiment. In an embodiment, a BiLSTM includes a forward LSTM 1018 that analyzes data from the beginning to the end and a backward LSTM 1020 that analyzes data from the end to the beginning. In the system 1000, the character identifiers (e.g., $c_{24}$ for letter "i" 1008) are used to identify characters and should not be confused with the cell state for the LSTM described in connection with FIG. 4.

In the system 1000, a sequence of characters representing the word "quick" are analyzed. The sequence of characters includes a beginning of word marker 1002 (e.g., "[BOW]"), the letter "q" 1004, the letter "u" 1006, the letter "i" 1008, the letter "c" 1010, the letter "k" 1012, an end of word marker 1014 (e.g., "[EOW]"), and a padding marker 1016

(e.g., "PAD") representing the space between "quick" and the next word (e.g., "brown").

In the system 1000, the forward LSTM 1018 starts with an initial hidden state $\vec{h}_{20}$ and, using the equations described above at least in connection with FIG. 4, computes forward hidden states for the sequence of letters in the word "quick" (e.g., "BOW" "q" "u" "i" "c" "k" "EOW" "PAD"). The result of this sequence of forward hidden states is the final forward hidden state $\vec{h}_{29}$ of the sequence. Forward hidden states in FIG. 4 (e.g., states of a forward LSTM) are denoted with an arrow from left to right and backward hidden states (e.g., states of a backward LSTM) are denoted with an arrow from right to left.

Also in the system 1000, the backward LSTM 1020 starts with an initial hidden state $\bar{h}_{20}$ and, using the equations described above at least in connection with FIG. 4, computes backward hidden states for the sequence of letters in the word "quick" (e.g., "[PAD]" "[EOW]" "k" "c" "i" "u" "q" "[BOW]"). The result of this sequence of backward hidden states is the final backward hidden state $\bar{h}_{29}$ of the sequence.

In an embodiment, the character-level features for the word "quick" (in this case, the third word) are concatenated together as illustrated in the equation 1022 (e.g., $w_3^{char} := (\vec{h}_{29}; \bar{h}_{29})$) where $w_3^{char}$ represents the character-level features for the third word and $w_3^{char}$ is a combination of the final forward hidden state $\vec{h}_{29}$ and the final backward hidden state $\bar{h}_{29}$ of the sequence.

Figure 11:
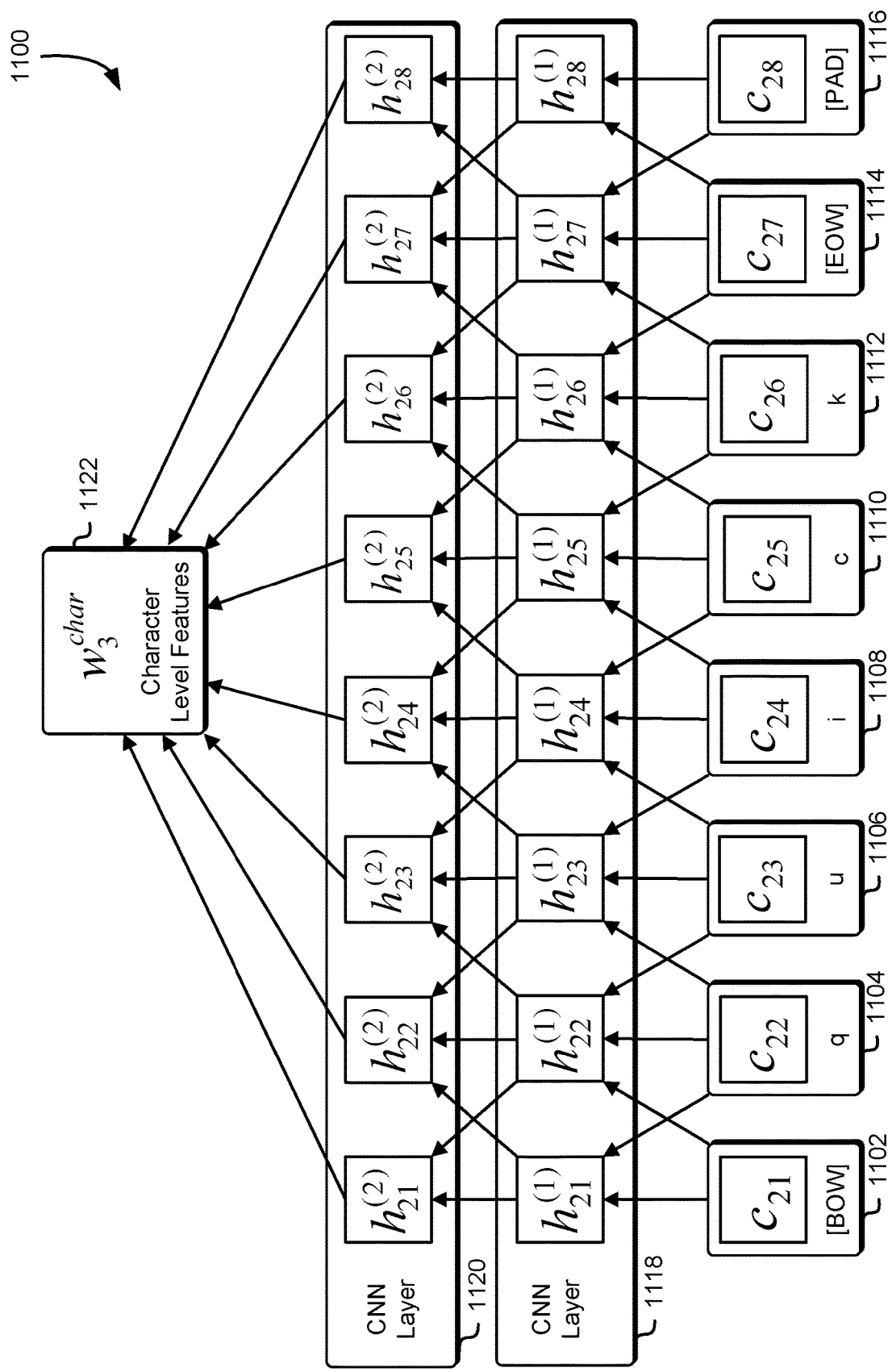
FIG. 11 illustrates a system where character encoding is performed with a convolutional neural network model using a keyphrase extraction service, in accordance with one embodiment.

FIG. 11 illustrates a system 1100 where character encoding is performed with a convolutional neural network model using a keyphrase extraction service as described in connection with FIG. 1 and in accordance with one embodiment. In the system 1100 illustrated in FIG. 11, the CNN has two layers (e.g., CNN layer 1118 and CNN layer 1120). In one embodiment, the CNN has more than two layers. In the system 1100, the character identifiers (e.g., $c_{24}$ for letter "i" 1108) are used to identify characters and should not be confused with the cell state for the LSTM described in connection with FIG. 4.

As with the system 1000, in the system 1100, a sequence of characters representing the word "quick" are analyzed. The sequence of characters includes a beginning of word marker 1102 (e.g., "[BOW]"), the letter "q" 1104, the letter "u" 1106, the letter "i" 1108, the letter "c" 1110, the letter "k" 1112, an end of word marker 1114 (e.g., "[EOW]"), and a padding marker 1116 (e.g., "[PAD]") representing the space between "quick" and the next word (e.g., "brown").

In the system 1100, CNN layer 1118 analyzes a character and neighboring characters to encode a first set of hidden states. For example, the hidden state $h_{24}^{(1)}$ of the CNN layer 1118 (which represents the hidden state for the CNN layer 1118 corresponding to character $c_{24}$ (e.g., the letter "i" 1108)) is determined from the character $c_{24}$ as well as from the character $c_{23}$ (e.g., the letter "u" 1106) and the character $c_2$ (e.g., the letter "c" 1110).

In the system 1100, CNN layer 1120 uses the first set of hidden states to encode a second set of hidden states. For example, the hidden state $h_{24}^{(2)}$ of the CNN layer 1120 (which represents the hidden state for the CNN layer 1120 corresponding to character $c_{24}$ (e.g., the letter "i" 1108)) is determined from the hidden state $h_{24}^{(1)}$ of the CNN layer 1118 as well as from the hidden state $h_{23}^{(1)}$ of the CNN layer 1118 and the hidden state $h_{25}^{(1)}$ of the CNN layer 1118. As illustrated in the system 1100, the two CNN layers (e.g., CNN layer 1118 and CNN layer 1120) encode the hidden state from a number of characters. For example, the hidden state $h_{24}^{(2)}$ of CNN layer 1120 (which represents the hidden state for the CNN layer 1120 corresponding to character $c_{24}$ (e.g., the letter "i" 1108)) is based on the characters "q" "u" "i" "c" and "k."

In one embodiment, the character-level features for the word "quick" (in this case, the third word) are concatenated 1122 together to produce $w_3^{char}$, which represents the character-level features for the third word and is a combination of the hidden states from the CNN layer 1120.

FIG. 12 illustrates an example 1200 of an equation for extracting word-level features based in part on a character encoding result usable by a keyphrase extraction service as described in connection with FIG. 1 and in accordance with one embodiment. In the example 1200, the equation 1202 ($w_i^{full} := (w_i^{char}, w_i^{word}, w_i^{gaz})$) encodes the word-level input features (described below and used to encode the word-level features of a word) $w^{full}$ by combining the character-level features $w^{char}$ described above with word features from a word corpus ($w^{word}$) and/or a word gazetteer ($w^{gaz}$). In one embodiment, when a model is being constructed or trained, various dropout parameters are added to the word-level input features to change the weighting of the word-level input features, which, for some models, improves the efficacy of the training phase.

Figure 13:
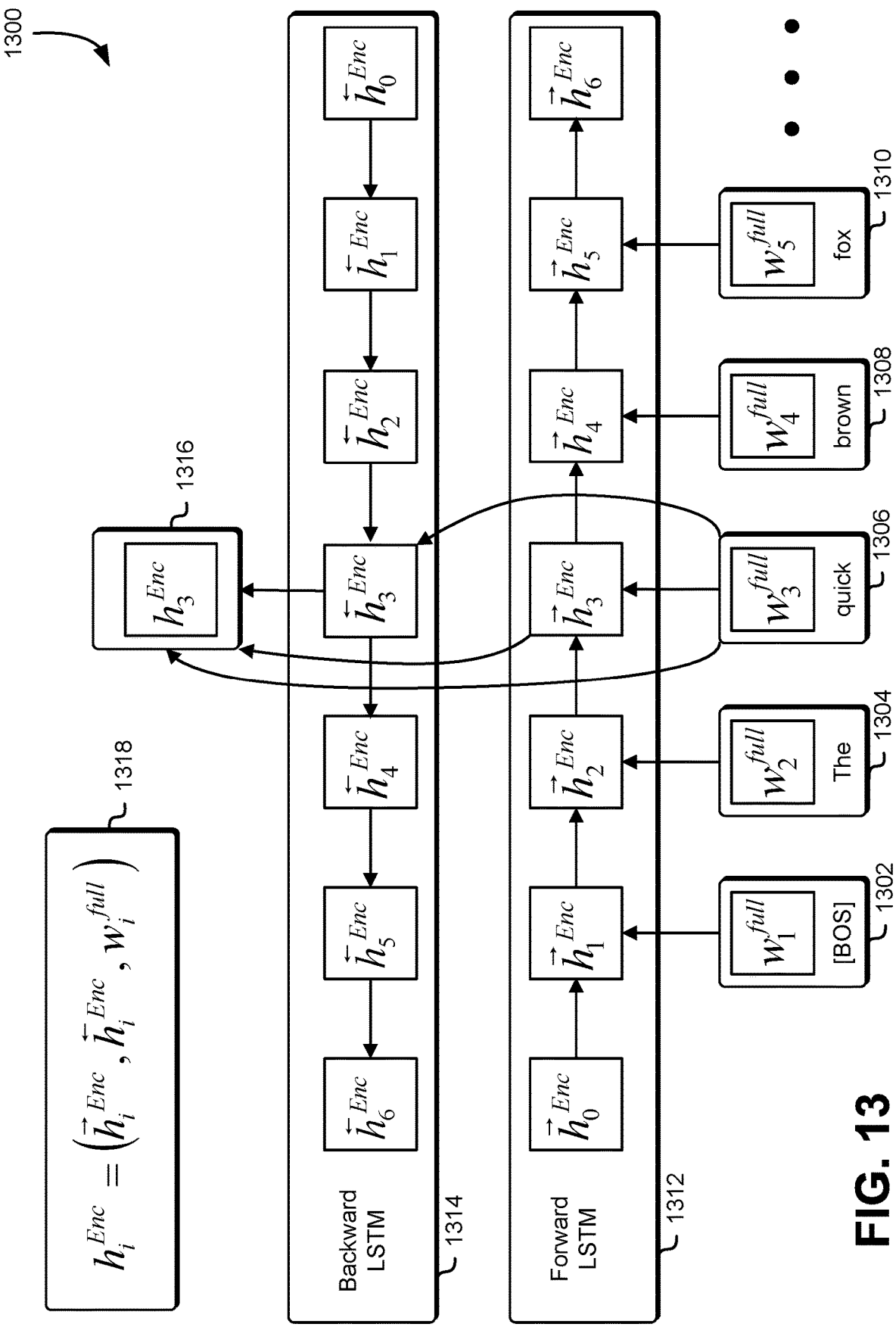
FIG. 13 illustrates a system where a word representation is generated from extracted word-level features using a bidirectional long short-term memory model in a keyphrase extraction service, in accordance with one embodiment.

FIG. 13 illustrates a system 1300 where a word representation is generated from extracted word-level features using a bidirectional long short-term memory model in a keyphrase extraction service as described in connection with FIG. 1 and in accordance with one embodiment. In the system 1300 illustrated in FIG. 13, a sequence of words representing the sequence "The quick brown fox" is analyzed. The sequence of words includes a beginning of sequence marker 1302 (e.g., "[BOS]"), the word "The" 1304, the word "quick" 1306, the word "brown" 1308, and the word "fox" 1310. In the system 1300, a forward hidden state $\vec{h}_3^{Enc}$ is encoded from the word-level input features $w_3^{full}$ of the word "quick" 1306 using the forward LSTM 1312 and a backward hidden state $\bar{h}_3^{Enc}$ is also encoded from the word-level input features $w_3^{full}$ of the word "quick" 1306 using the backward LSTM 1314. In one embodiment, the word representation $h_3^{Enc}$ is generated 1316 from the forward hidden state $\vec{h}_3^{Enc}$, the backward hidden state $\bar{h}_3^{Enc}$, and the word-level input features $w_3^{full}$ of the word as illustrated by the equation 1318 ($h_i^{Enc} = (\vec{h}_i^{Enc}, \bar{h}_i^{Enc}, w_i^{full})$). In one embodiment, the word representation $h_3^{Enc}$ is generated 1316 only from the forward hidden state $\vec{h}_3^{Enc}$ and the backward hidden state $\bar{h}_3^{Enc}$. It should be noted that, while not illustrated in FIG. 13, the other word representations for the other words (e.g., the word "brown" 1308) are computed using the same techniques.

Figure 14:
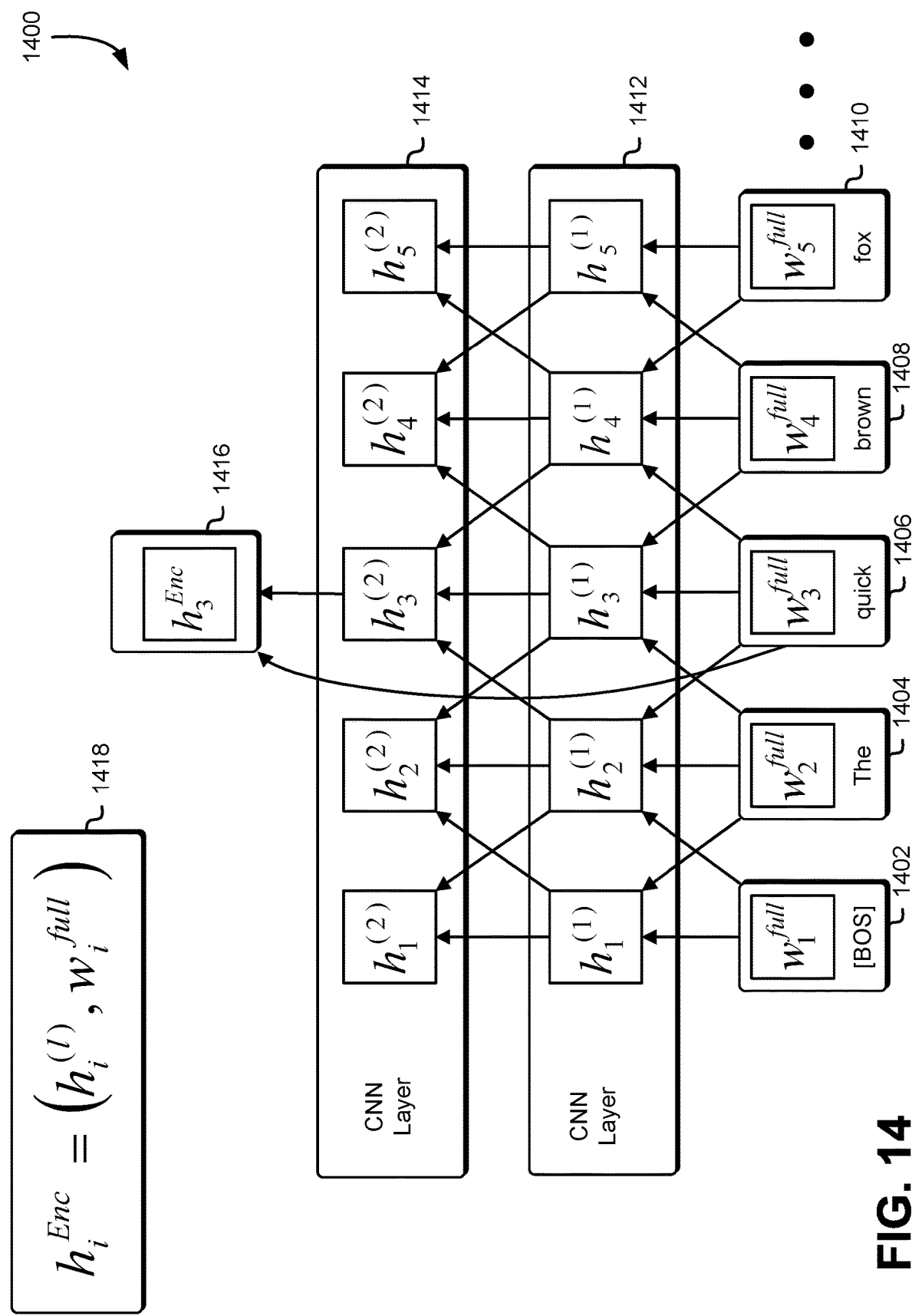
FIG. 14 illustrates a system where a word representation is generated from extracted word-level features using a convolutional neural network model in a keyphrase extraction service, in accordance with one embodiment.

FIG. 14 illustrates a system 1400 where a word representation is generated from extracted word-level features using a convolutional neural network model in a keyphrase extraction service as described in connection with FIG. 1 and in accordance with one embodiment. In the system 1400 illustrated in FIG. 14, a sequence of words representing the sequence "The quick brown fox" is analyzed. The sequence of words includes a beginning of sequence marker 1402 (e.g., "[BOS]"), the word "The" 1404, the word "quick" 1406, the word "brown" 1408, and the word "fox" 1410. In the example illustrated in FIG. 14, the convolutional neural network model has two layers (e.g., CNN layer 1412 and CNN layer 1414).

As with the CNN used to encode character-level features described in connection with FIG. 11, the CNN used to encode a word representation described in connection with FIG. 14 encodes a first hidden state from the words in the CNN layer 1412 and then encodes a second hidden state from the first hidden states in the CNN layer 1414. In the system 1400, the CNN layer 1412 encodes the first hidden state $h_3^{(1)}$ corresponding to the word "quick" 1406 using the full word representation $w_2^{full}$ of the word "The" 1404, the full word representation $w_3^{full}$ of the word "quick" 1406, and the full word representation $w_4^{full}$ of the word "brown" 1408. Similarly, the CNN layer 1414 encodes the second hidden state $h_3^{(2)}$ (also corresponding to the word "quick" 1406) using the hidden state $h_2^{(1)}$ from CNN layer 1412, the hidden state $h_3^{(1)}$ from CNN layer 1414, and the hidden state $h_4^{(1)}$ from CNN layer 1412.

In one embodiment, the word representation 1416 ($h_3^{Enc}$) is encoded from the hidden state $h_3^{(2)}$ from CNN layer 1414 and the word-level input features $w_3^{full}$ of the word "quick" 1406 as illustrated by the equation 1418 ($h_i^{Enc}=(h_i^{(1)}, w_i^{full})$). In one embodiment, the word representation 1416 ($h_3^{Enc}$) is encoded from the hidden state $h_3^{(2)}$ from CNN layer 1414 without the word-level input features $w_3^{full}$ of the word "quick" 1406.

Figure 15:
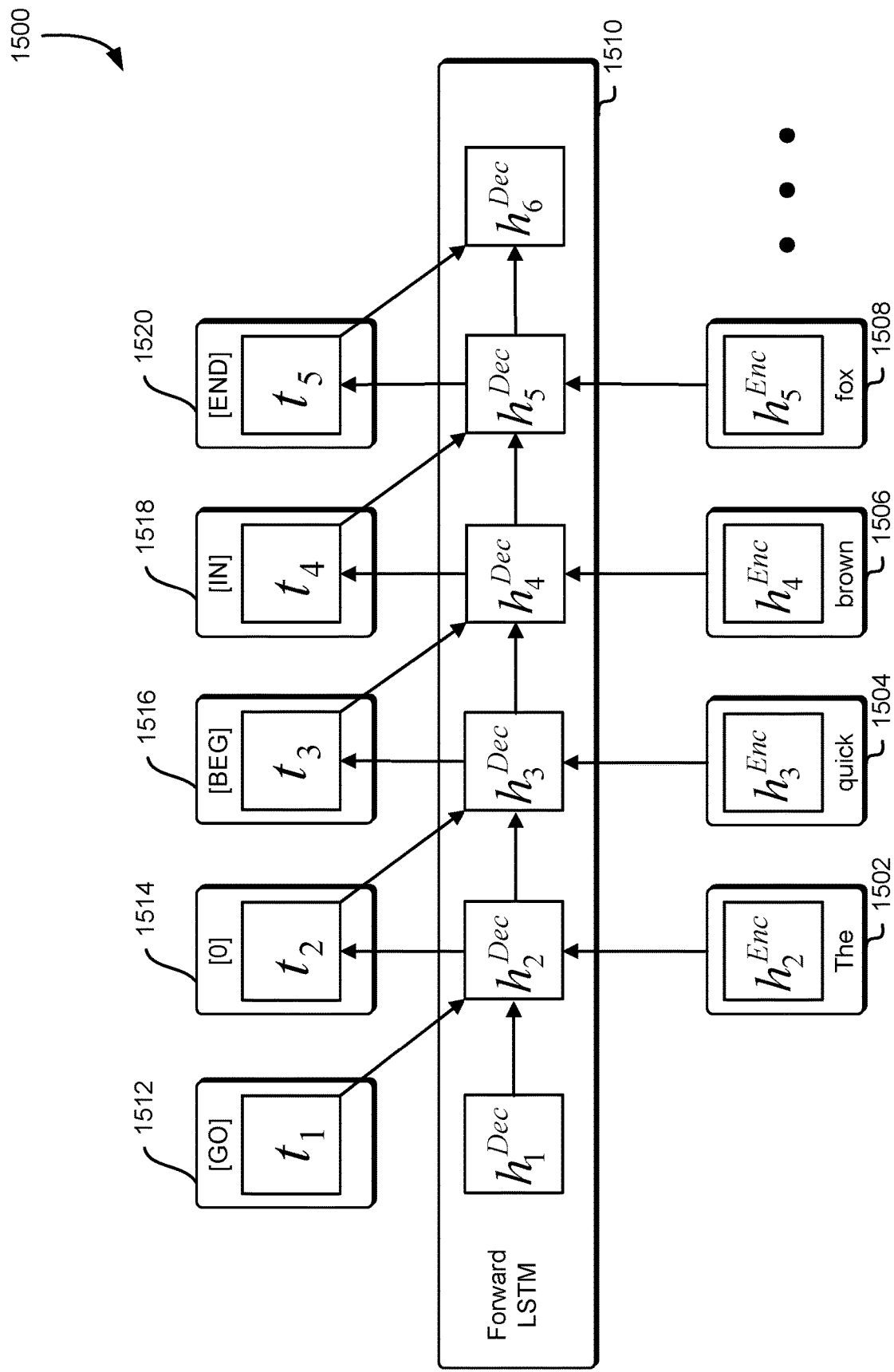
FIG. 15 illustrates a system where tag labels are generated from word representations using a long short-term memory model in a keyphrase extraction service, in accordance with one embodiment.

FIG. 15 illustrates a system 1500 where tag labels are generated from word representations using a long short-term memory model in a keyphrase extraction service as described in connection with FIG. 1 and in accordance with one embodiment. In the system 1500 illustrated in FIG. 15, a sequence of words representing the sequence "The quick brown fox" is analyzed. The sequence of words includes the word "The" 1502, the word "quick" 1504, the word "brown" 1506, and the word "fox" 1508. In the system 1500 illustrated in FIG. 15, a forward LSTM 1510 decodes word representations (described above) from a previous hidden state, the encoded word representation, and a tag for the previous encoded word representation. Although not illustrated in FIG. 15, in one embodiment, the tag labels are generated from word representations using another neural model (e.g., a BiLSTM, a CNN, a GRU, or another neural model).

In one embodiment, a tag that indicates the start of a sequencing task (e.g., keyphrase extraction) is provided as the tag for the previous encoded word representation for the first word in the sequence (e.g., the word "The" 1502). In the system 1500, the tag 1512 (e.g., the tag "[GO]") is provided as the tag for the previous encoded word representation for the first word in the sequence (e.g., the word "The" 1502). In one embodiment, a tag that indicates the start of a particular sequencing task (e.g., the tag "[GO_KEY-PHRASE]" that indicates the start of a keyphrase extraction task) is provided as the tag for the previous encoded word representation for the first word in the sequence.

In the system 1500, the forward LSTM 1510 receives the word representation $h_2^{Enc}$ corresponding to the word "The" 1502, a previous hidden state $h_1^{Dec}$ and the tag 1512 ("[GO]") and produces a next hidden state $h_2^{Dec}$ and a next tag 1514 (e.g., a null tag "[0]". The forward LSTM 1510 continues to analyze the word sequence and next receives the word representation $h_3^{Enc}$, the hidden state $h_2^{Dec}$ (e.g., the hidden state from the previous step), the tag 1514 ("[0]") and produces a next hidden state $h_3^{Dec}$ and a tag 1516 ("[BEG]") that indicates a probability that the word "quick" is the start of a keyphrase. In one embodiment, the forward LSTM 1510 continues to analyze the sequence of words until all key phrases are found. In the system 1500, the forward LSTM 1510 generates the tag 1518 ("[IN]") that indicates a probability that the word "brown" is inside the keyphrase and the tag 1520 ("[END]") that indicates a probability that the word "fox" is the end of the keyphrase. In the system 1500, the forward LSTM 1510 has identified the keyphrase "quick brown fox."

Figure 16:
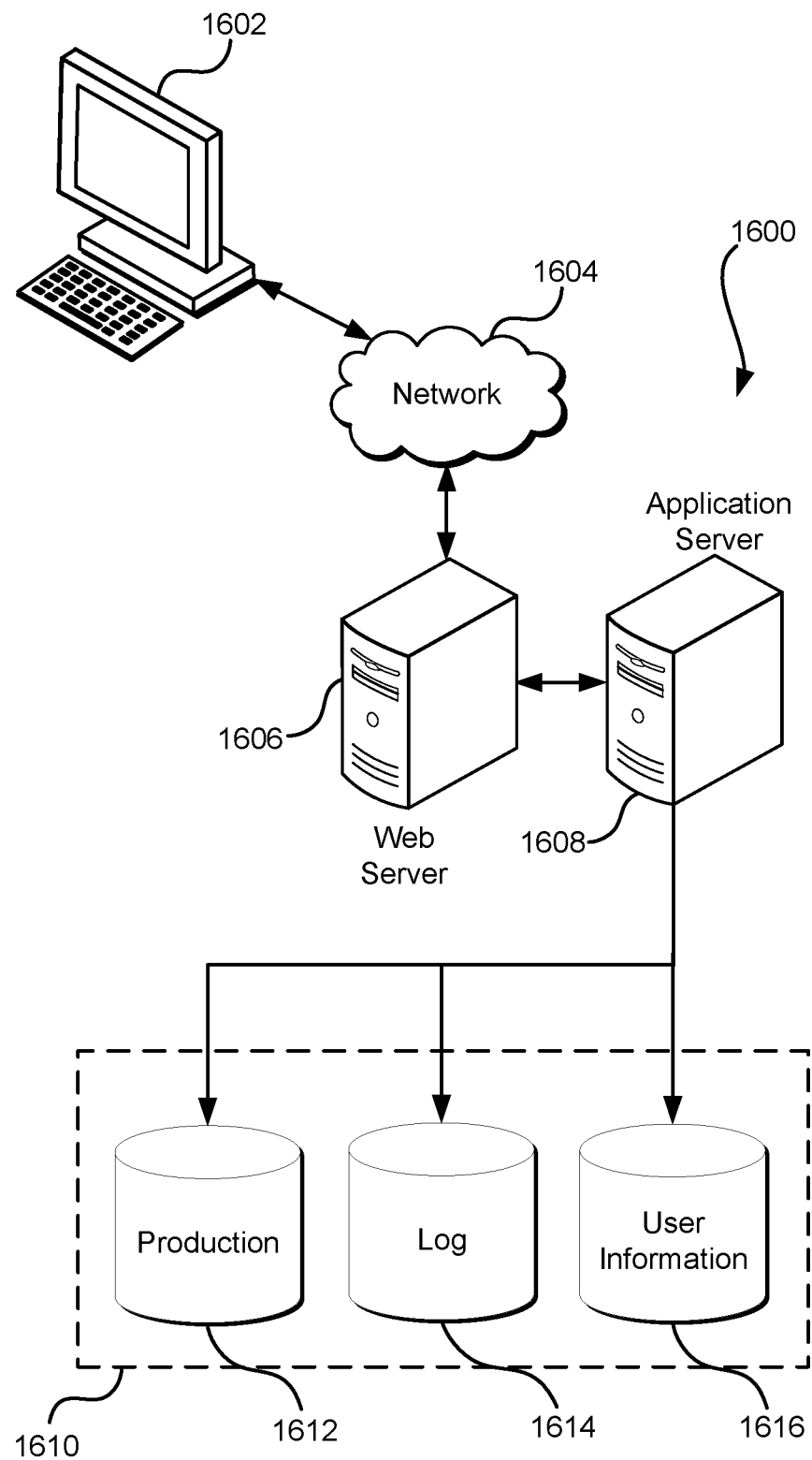
FIG. 16 illustrates an environment in which various embodiments can be implemented.

FIG. 16 illustrates aspects of an example environment 1600 for implementing aspects in accordance with various embodiments. As will be appreciated, although a web-based environment is used for purposes of explanation, different environments may be used, as appropriate, to implement various embodiments. The environment includes an electronic client device 1602, which can include any appropriate device operable to send and/or receive requests, messages, or information over an appropriate network 1604 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation ("JSON"), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1602 and the application server 1608, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1610 can include several separate data tables, databases, data documents, dynamic data storage schemes, and/or other data storage mechanisms and media for storing data relating to a particular aspect of the present disclosure. For example, the data store illustrated may include mechanisms for storing production data 1612 and user information 1616, which can be used to serve content for the production side. The data store also is shown to include a mechanism for storing log data 1614, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 1610. The data store 1610 is operable, through logic associated therewith, to receive instructions from the application server 1608 and obtain, update, or otherwise process data in response thereto. The application server 1608 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1602. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C #, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    generating a set of features for a document comprising a set of words by at least:
        selecting a word from the set of words;
        using a first neural model to detect a word-level feature corresponding to the word based at least in part on the word and features of words adjacent to the word in the set of words, the word-level feature including a position-specific feature of the word corresponding to a position of the word relative to the words adjacent to the word; and
        using a second neural model to detect a set of character-level features of the word by at least encoding features of the word corresponding to members of the set of character-level features of the word using a bidirectional long short-term memory model, where a character-level feature of the set of character-level features includes features relative to the members of the set of character-level features;
    generating a set of labels that categorize words in the document by at least:
        selecting the word-level feature and character-level features; and
        using a third neural model to determine a label for the word based at least in part on the word-level feature detected using the first neural model and character-level features detected using the second neural model and a subset of labels of the set of labels associated with words adjacent to the word in the set of words, where the label provides sequence information and a speech tag associated with the word to identify a keyphrase for the document, where the sequence information indicates a position of the word relative to the keyphrase for the document and the speech tag denotes a part of speech of the word;
    determining the keyphrase for the document based at least in part on the set of labels indicating a subset of words of the set of words comprising the keyphrase; and
    indicating the keyphrase.

2. The computer-implemented method of claim 1, wherein the first neural model is a bidirectional long short-term memory model.

3. The computer-implemented method of claim 1, wherein the third neural model is a long short-term memory model.

4. The computer-implemented method of claim 1, wherein the sequence information indicates at least one of: beginning of keyphrase, inside keyphrase, end of keyphrase, singleton keyphrase, or outside of keyphrase.

5. A system, comprising:
    memory to store computer-executable instructions that, as a result of being executed by one or more processors, cause the system to:
        select a first word from a set of words;
        use a first neural model to determine a plurality of word-level features including a first word-level feature for the first word based at least in part on a feature corresponding to the first word and a second word-level feature corresponding to a second word in the set of words, the feature including a position-specific feature of the first word corresponding to a position of the first word relative to the second word adjacent to the first word;

use a second neural model to detect a set of character-level features of the first word by at least encoding a first character feature of the set of character-level features of the first word, where the first character feature corresponds to a first character in the first word relative to a second character of the set of characters in the first word adjacent to the first character, where encoding the set of character-level features is performed using a bidirectional long short-term memory model;

use a third neural model to detect, based at least in part on the first word-level feature and the first character feature of the set of character-level features of the first word, a set of speech tags including a speech tag for the first word, the speech tag indicating a part of speech of the first word;

determine a keyphrase associated with the set of words based at least in part on the plurality of word-level features the set of speech tags, and the set of character-level features, where the plurality of word-level features indicates position information of the keyphrase within the set of words; and indicate the keyphrase.

6. The system of claim 5, wherein the first word-level feature for the first word is based at least in part on a sequencing task performed by the system.

7. The system of claim 5, wherein the computer-executed instructions further include instructions that, as a result of being executed by the one or more processors, cause the system to:

determine a position for the first word based at least in part on the plurality of word-level features; and indicate the position.

8. The system of claim 5, wherein the computer-executed instructions that cause the system to use the third neural model to detect the set of speech tags further include instructions that, as a result of being executed by the one or more processors, cause the system to:

determine the set of speech tags by at least providing the plurality of word-level features to the third neural model as an input; and indicate the part of speech.

9. The system of claim 5, wherein the set of words is an advertisement or a product review.

10. The system of claim 5, wherein the set of words is a sequence of words, the sequence of words specifying a sequential order of the set of words.

11. The system of claim 10, wherein the first word-level feature is based at least in part on a hidden state associated with a previous word of the sequence of words.

12. The system of claim 10, wherein the second word-level feature is based at least in part on a third word-level feature associated with a previous word of the sequence of words.

13. A non-transitory computer-readable storage medium having stored thereon executable instructions that, as a result of being executed by one or more processors of a computer system, cause the computer system to at least:

select a first word from a set of words;

use a first neural model to determine a first word-level feature of a plurality of word-level features for the first word based at least in part on the first word and a second word-level feature corresponding to a second word in the set of words, the first word-level feature including a position-specific feature of the first word corresponding to a position of the first word relative to a keyphrase of the set of words;

use a second neural model to detect a set of character-level features of the first word by identifying a first feature of the set of character-level features that defines the first word, the second neural model encoding the set of character-level features of the first word, where members of the set of character-level features correspond to characters in the first word using a bidirectional long short-term memory model;

use a third neural model to determine, based at least in part on the first word-level feature and the first feature of the set of character-level features that defines the first word, a speech tag for the first word, where the speech tag is a member of a set of speech tags indicating parts of speech corresponding to words of the set of words; and determine the keyphrase based at least in part on the first word-level feature, the speech tag, and the set of character-level features, where the first word-level feature indicates position information associated with the keyphrase and the speech tag denotes a part of speech associated with the first word.

14. The non-transitory computer-readable storage medium of claim 13, wherein the executable instructions further comprise instructions that, as a result of being executed by the one or more processors, cause the computer system to indicate the keyphrase.

15. The non-transitory computer-readable storage medium of claim 13, wherein the executable instructions further comprise instructions that, as a result of being executed by the one or more processors, cause the computer system to use a fourth neural model to detect the keyphrase using the plurality of word-level features and the set of speech tags.

16. The non-transitory computer-readable storage medium of claim 13, wherein the third neural model is a bidirectional long short-term memory model.

17. The non-transitory computer-readable storage medium of claim 13, wherein the third neural model is a convolutional neural network model.

18. The non-transitory computer-readable storage medium of claim 13, wherein the first neural model is a long short-term memory model.

19. The non-transitory computer-readable storage medium of claim 13, wherein the executable instructions that cause the computer system to determine the keyphrase further include instructions that, as a result of being executed by the one or more processors, cause the computer system to determine the keyphrase using a fourth neural model.

20. The non-transitory computer-readable storage medium of claim 13, wherein the first word-level feature for the first word is determined based at least in part on a word corpus or a word gazetteer.

* * * * *